(12) United States Patent
Huang et al.

(10) Patent No.: US 10,034,304 B2
(45) Date of Patent: Jul. 24, 2018

(54) FAIRNESS IN CLEAR CHANNEL ASSESSMENT UNDER LONG SENSING TIME

(71) Applicants: Po-Kai Huang, Santa Clara, CA (US); Qinghua Li, San Ramon, CA (US); Laurent Cariou, Portland, OR (US); Xiaogang Chen, Beijing (CN)

(72) Inventors: Po-Kai Huang, Santa Clara, CA (US); Qinghua Li, San Ramon, CA (US); Laurent Cariou, Portland, OR (US); Xiaogang Chen, Beijing (CN)

(73) Assignee: Intel IP Corporation, Santa Clara, CA (US)

( * ) Notice: Subject to any disclaimer, the term of this patent is extended or adjusted under 35 U.S.C. 154(b) by 152 days.

(21) Appl. No.: 14/869,372

(22) Filed: Sep. 29, 2015

(65) Prior Publication Data
US 2016/0381706 A1 Dec. 29, 2016

Related U.S. Application Data

(60) Provisional application No. 62/185,387, filed on Jun. 26, 2015.

(51) Int. Cl.
| | |
|---|---|
| *H04W 74/08* | (2009.01) |
| *H04W 52/02* | (2009.01) |
| *H04W 84/12* | (2009.01) |

(52) U.S. Cl.
CPC .... *H04W 74/0808* (2013.01); *H04W 52/0216* (2013.01); *H04W 52/0229* (2013.01); *H04W 84/12* (2013.01); *Y02D 70/00* (2018.01); *Y02D 70/1224* (2018.01); *Y02D 70/1242* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/162* (2018.01); *Y02D 70/164* (2018.01); *Y02D 70/166* (2018.01); *Y02D 70/168* (2018.01); *Y02D 70/22* (2018.01); *Y02D 70/26* (2018.01)

(58) Field of Classification Search
CPC ......... H04W 74/0808; H04W 52/0216; H04W 52/0229; H04W 84/12
See application file for complete search history.

(56) References Cited

U.S. PATENT DOCUMENTS

| | | | | |
|---|---|---|---|---|
| 2010/0195664 A1* | 8/2010 | Ho | .................. | H04L 12/413 370/445 |
| 2012/0155487 A1* | 6/2012 | Du | .................. | H04B 3/544 370/445 |
| 2016/0135224 A1* | 5/2016 | Lee | .................. | H04L 27/2607 370/338 |

(Continued)

*Primary Examiner* — Noel R Beharry
*Assistant Examiner* — Sharmin Chowdhury
(74) *Attorney, Agent, or Firm* — Eversheds Sutherland (US) LLP

(57) ABSTRACT

Mechanisms for clear channel assessment associated with a communication channel in a wireless environment are provided. Implementation of the mechanisms provides fairness in the utilization of wireless communication resources among contemporaneous communication devices and legacy communication devices. The communication channel can be embodied in a primary channel or a secondary channel according to communication protocols within the IEEE 802.11 family of protocols.

25 Claims, 19 Drawing Sheets

(56) References Cited

U.S. PATENT DOCUMENTS

2016/0150534 A1* 5/2016 Kwon ............... H04W 72/0446
370/338
2016/0212764 A1* 7/2016 Yin ................... H04W 74/0808

* cited by examiner

FAIRNESS IN CLEAR CHANNEL ASSESSMENT UNDER LONG SENSING TIME

CROSS-REFERENCE TO RELATED APPLICATIONS

This application is related to and claims priority from U.S. Provisional Patent Application No. 62/185,387, filed Jun. 26, 2015, the entirety of which application is hereby incorporated herein by reference in its entirety.

TECHNICAL FIELD

This disclosure generally relates to systems and methods for wireless communications and, more particularly, to a mechanism for maintaining fairness under long clear channel assessment (CCA) sensing time.

BACKGROUND

In some wireless environments, communication devices (e.g., access point devices, station devices, or the like) can transmit or can attempt to transmit information within a limited amount of radiofrequency (RF) spectrum that is shared among the communication devices. As such, some wireless communication protocols (such as the family of IEEE 802.11 protocols) can include periods of contention and/or backoff prior to transmission of information from a communication device. Such periods can be utilized or otherwise relied upon to determine whether a channel, for example, is clear for the transmission.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

Figure 1:
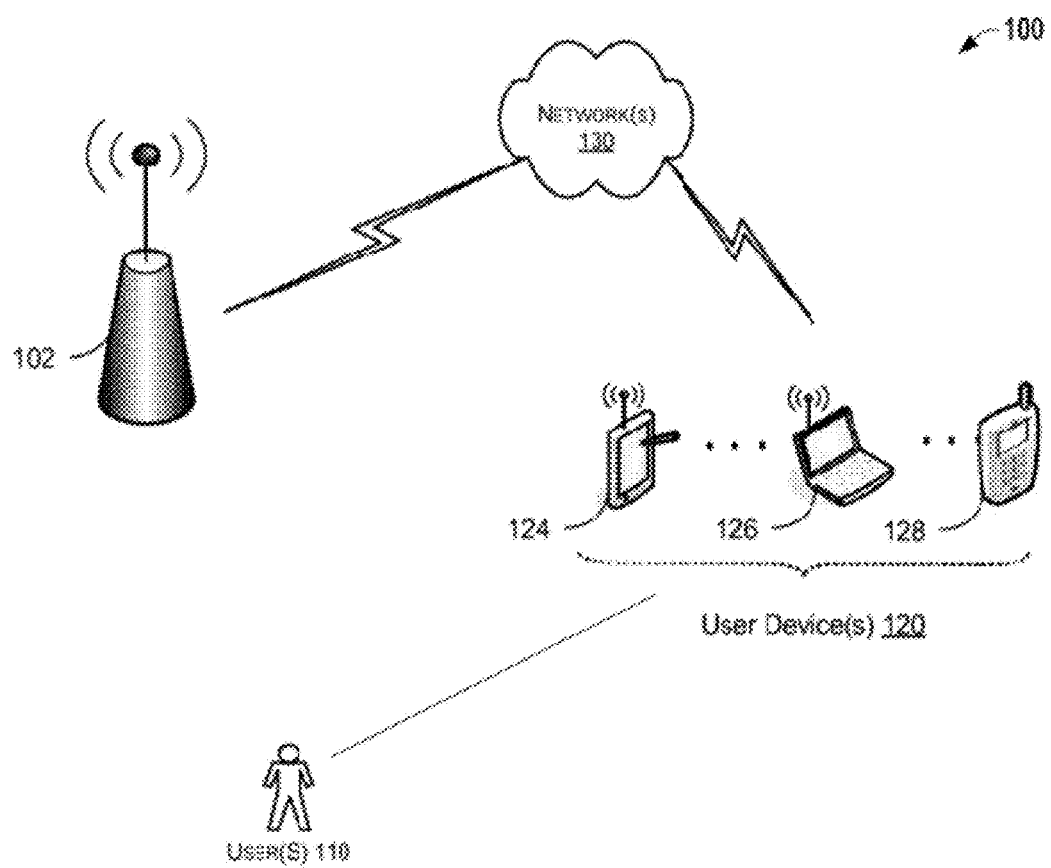
FIG. 1 illustrates a network diagram illustrating an example network environment of an illustrative wireless communication system according to one or more example embodiments of the disclosure.

The detailed description is set forth with reference to the accompanying drawings, which are not necessarily drawn to scale. The use of the same reference numbers in different figures indicates similar or identical items. Illustrative embodiments will now be described more fully hereinafter with reference to the accompanying drawings, in which some, but not all embodiments of the disclosure are shown. The disclosure may be embodied in many different forms and should not be construed as limited to the embodiments set forth herein; rather, these embodiments are provided so that this disclosure will satisfy applicable legal requirements.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

The term "exemplary" is used herein to mean "serving as an example, instance, or illustration." Any embodiment described herein as "exemplary" is not necessarily to be construed as preferred or advantageous over other embodiments. The terms "computing device," "communication station," "station" (also referred to as STA), "handheld device," "mobile device," "wireless device," "user device," and/or "user equipment" (UE) as used herein refers to a wireless communication device such as a cellular telephone, smartphone, tablet, netbook, wireless terminal, laptop computer, a femtocell, High Data Rate (HDR) subscriber station, access point, access terminal, a printer, a scanner, a copier, a facsimile machine, or other personal communication system (PCS) device. The device may be either mobile or stationary.

As utilized herein, the term "communicate" is intended to include transmitting, or receiving, or both transmitting and receiving. This may be particularly, yet not exclusively, useful in claims when describing the organization of data that is being transmitted by one device and received by another, but only the functionality of one of those devices is required to infringe the claim. Similarly, exchange of data between two devices (both devices transmit and/or receive during the exchange, for example) may be described as "communicating," when only the functionality of one of those devices is being claimed. The term "communicating"

as used herein with respect to a wireless communication signal includes transmitting the wireless communication signal and/or receiving the wireless communication signal. For example, a wireless communication device (which also may be referred to as a "communication device"), which is capable of communicating a wireless communication signal, may include a transceiver, including a transmitter to transmit the wireless communication signal to at least one other wireless communication unit, and/or a wireless communication receiver to receive the wireless communication signal from at least one other wireless communication unit.

The term "access point" (AP) device (or AP) as used herein may be a fixed station. An AP device may also be referred to as an access node, a base station device or some other similar terminology known in the art. An access terminal may also be called a mobile station, user equipment (UE), a user device, a station (STA), a wireless communication device, and/or some other similar terminology known in the art. Embodiments disclosed herein generally pertain to wireless networks. Some embodiments can relate to wireless networks that operate in accordance with one of the IEEE 802.11 standards, including the IEEE 802.11ax standard.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a user device, a station (STA), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems following one or more wireless communication protocols, for example, Orthogonal Frequency-Division Multiple Access (OFDMA), Radio Frequency (RF), Infra-Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems, and/or networks.

FIG. 1 is a network diagram that illustrates an example of a network environment 100, according to some example embodiments of the present disclosure. Network environment 100 can include one or more user device(s) 120 and one or more access point (AP) device(s) 102, which may communicate in accordance with IEEE 802.11 communication standards, including IEEE 802.11ax. The user device(s) 120 may be mobile devices, stations (STAs), and/or the like that are non-stationary and do not have fixed locations, and/or other types of computing devices. The one or more APs 102 may be stationary and have fixed locations. In some embodiments, the user devices 120 and/or AP 102 can include one or more computing systems such as those illustrated in FIGS. 13-16.

In accordance with some IEEE 802.11ax (High-Efficiency WLAN (HEW)) embodiments, an access point device may operate as a master station which may be arranged to contend for a wireless medium (e.g., during a contention period) to receive exclusive control of the medium for an HEW control period. The master station may transmit an HEW master-sync transmission at the beginning of the HEW control period. During the HEW control period, HEW stations may communicate with the master station in accordance with a non-contention based multiple access technique. This is unlike conventional Wi-Fi communications in which devices communicate in accordance with a contention-based communication technique, rather than a multiple access technique. During the HEW control period, the master station may communicate with HEW stations using one or more HEW frames. Furthermore, during the HEW control period, legacy stations refrain from communicating. In some embodiments, the master-sync transmission may be referred to as an HEW control and schedule transmission.

In some embodiments, the multiple-access technique used during the HEW control period may be a scheduled orthogonal frequency division multiple access (OFDMA) technique, although this is not a requirement. In other embodiments, the multiple access technique may be a time-division multiple access (TDMA) technique or a frequency division multiple access (FDMA) technique. In certain embodiments, the multiple access technique may be a space-division multiple access (SDMA) technique.

In some implementations, the master station may also communicate with legacy stations in accordance with legacy IEEE 802.11 communication techniques. In some embodiments, the master station may also be configurable to communicate with HEW stations outside the HEW control period in accordance with legacy IEEE 802.11 communication techniques, although this is not a requirement.

One or more illustrative user device(s) 120 may be operable by one or more users 110. The user device(s) 120 may include any suitable processor-driven user device including, but not limited to, a desktop computing device, a laptop computing device, a server, a router, a switch, a smartphone, a tablet, wearable wireless device (e.g., bracelet, watch, glasses, ring, etc.) and so forth.

Any of the user device(s) 120 (e.g., user devices 124, 126, 128), and AP 102 may be configured to communicate with each other via one or more communications networks 130 wirelessly or wired. Any of the communications networks 130 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128), and AP device 102 may include one or more communications antennae. Communications antenna may be any suitable type of antenna corresponding to the communications protocols used by the user device(s) 120 (e.g., user devices 124, 126 and 128), and AP device 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, monopole antennas, folded dipole antennas, patch antennas, loop antennas, microstrip antennas, multiple-input multiple-output (MIMO) antennas, a combination thereof, or the like. The communications antenna may be communicatively coupled to a radio component to transmit and/or receive signals, such as communications signals to and/or from the user devices 120.

Any of the user devices 120 (e.g., user devices 124, 126, 128), and AP device 102 may include any suitable radio and/or transceiver for transmitting and/or receiving radio frequency (RF) signals in the bandwidth and/or channels corresponding to the communications protocols utilized by any of the user device(s) 120 and AP device 102 to communicate with each other. The radio components may include hardware and/or software to modulate and/or demodulate communications signals according to pre-established transmission protocols. The radio components may further include hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n), 5 GHz channels (e.g. 802.11n, 802.11ac), or 60 GHZ channels (e.g. 802.11ad). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In some embodiments, a STA 120 may be configured to transmit a data packet (e.g., a transmission frame, information, a signal, and/or the like) to the AP device 102. Typically, a data packet transmission is preceded by a packet header transmission (or a packet header may be included in the data packet transmission). The packet header (e.g., a data packet preamble) may be received by the AP 102 prior to the data packet and the AP device 102 may use the packet header to identify a transmitting STA 120, a destination device, channel allocation information, identify the data packet, and/or the like. In this manner, the packet header may be used to establish a communication connection between the STA 120 and the AP device 102 so that the data packet (and/or a stream of data packets) may be transmitted from the STA 120 to the AP 102.

In some embodiments, if multiple STAs 120 are configured to transmit (e.g., scheduled to transmit) data packets at the same time, collisions of data packets may occur. Various techniques may be applied by the AP device 102 and/or the STA 120 to reduce negative effects of multiple simultaneous transmissions. For example, the AP 102 may determine that one or more fields of information included in the packet header, such as a SIG field, contain an error (e.g., is busy). If an error in the packet header is determined by the AP device 102, then the AP device 102 may defer receiving transmissions from the transmitting STA 120 (e.g., the STA 120 that transmitted the faulty packet header). The STA 120 may then perform one or more backoff techniques to delay transmission of future data packets and/or packet headers. Meanwhile, the AP device 102 may determine to reallocate any communication connections and/or channels (e.g., primary and/or secondary channels) used to transmit from the STA 120 to the AP device 102 so that the AP device 102 may receive other transmissions from other STAs 120 that are not determined to be faulty.

Additionally, a duration of time that the AP device 102 is configured to receive and/or analyze packet headers may be extended by a predetermined factor (e.g., by a factor of 4). Extending the duration of time in which the AP device 102 is configured to receive and/or analyze packet headers may enable the AP device 102 to determine that a packet header is indeed not faulty even if one or more errors were determined to be included in the packet header. For example, a packet header from an STA 120 may be resent in the extended duration of time, where a first transmission of the packet header includes an error (such as a lost piece of information to be included in the packet header), but a second transmission of the same packet header does not include an error. As such, the extended duration of time may allow the AP device 102 to determine that the packet header indeed is not faulty and that establishment of a communication connection and/or a transmission of a data packet or data packet stream may ensue.

However, this extended duration of time during which the AP device 102 may receive and/or analyze packet headers may lead to unfairness for 802.11ax devices that require a longer CCA sensing time. For example, legacy devices with a shorter duration requirement may never be deferred for 802.11ax devices with a longer duration requirement.

Figure 2:
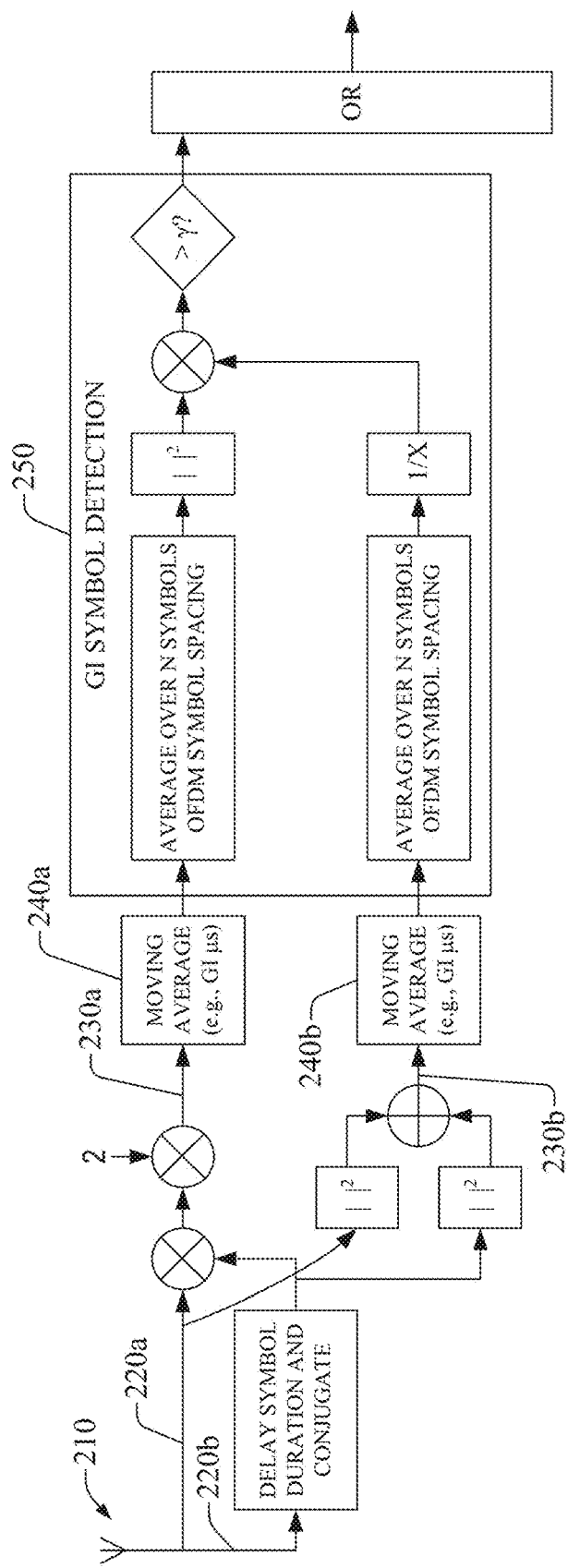
FIG. 2 illustrates an example of receiver circuitry in a communication device for clear channel assessment in accordance with one or more embodiments of the disclosure.

FIG. 2 illustrates an example of receiver circuitry 200 for CCA in accordance with one or more embodiments of the disclosure. In some embodiments, implementation of CCA, which also may be referred to as mid-packet detection (MPD) sensing can be implemented via correlation of two streams of symbols, where one of the streams is delayed and conjugated with respect to the other stream. As illustrated the receiver circuitry includes one or more antennas 210 that can receive wireless signal (e.g., pilot signal) according to a radio technology protocol. The exemplified receiver circuitry 200 can include circuitry (e.g., one or more processors) that can split a received stream of information (e.g., symbols) into two streams 220a and 220b. The circuitry or other circuitry coupled thereto can apply a delay to the symbol duration of the stream 220b and also can apply a conjugate operation. In addition, in one embodiment, the circuitry or other circuitry coupled thereto can determine (e.g., compute) received power for each of the streams 220a and 220b. To the end, for example, the amplitude of the signal indicative of each symbol in each of the streams 220a and 220b can be determined by such circuitry. The determined amplitudes can be combined and an output 230b can be generated by the circuitry, and a moving average 240b over a defined (e.g., predetermined or dynamically determined) interval can be computed by such circuitry, for example. Similarly, in some embodiments, the stream 220a and the stream resulting from applying a delay and conjugate operation to stream 22b can be combined with certain operation by the circuitry, for example, to form an output 230a. A moving average 240a over the defined interval also can be determined by the circuitry. In some embodiments, the defined interval embodies or otherwise includes duration of a guard interval (GI).

The exemplified receiver circuitry 200 can include a symbol detection component 250 that can determine, for example, two averages of OFDM symbols spacing over N symbols (with N a natural number greater than 1). The averages can be utilized to determine a metric for power and/or CCA. In some embodiments, one of the averages, as determined via input from 240b, can be representative of power. In other embodiments, one of the averages, as determined via input from 240a, can be representative of signal and the other average, as determined via input 240b is inverted in order to be utilized for normalization of the first average (e.g., the average related to the input 240a). The determined metric (e.g., a scalar) can be compared to a defined threshold γ (a scalar, for example). A comparison between the metric and γ that indicates that the metric is greater than the defined threshold can be represent an affirmative mid-packet detection. It is noted that any normalization (other than received power, for example) can be utilized in the symbol detection component 250 in order to determine whether a mid-packet detection has occurred.

Regardless of the specific approach for CCA, the performance of the CCA can be better for longer sensing times—e.g., in scenarios in which the number of symbols N (an integer number equal to or greater than 2) averaged for CCA is higher. Yet, when N is higher, MPD can require higher sensing time in view of the greater number of symbols utilized in the average determination. For instance, in some embodiments, under the 4× symbol duration agreed for HE PPDU, the CCA sensing time can be 43 μs, 61 μs, and 70 μs, when N is equal to 2, 3, and 4 symbols. Therefore, in such embodiments, setting or otherwise selecting N=4 can provide best performance. Yet, when CCA is implemented in the primary communication channel, a communication device (e.g., a STA or an AP device) may not have access to 70 μs for CCA sensing.

Embodiments of the disclosure provide systems, devices, computer-program products, and methods that can implement or can permit implementations of clear channel assessment (CCA) under long sensing times (e.g., sensing times that span the duration of multiple symbols). Specifically, in some implementations, embodiments of the disclosure can address at least the issues mentioned above by providing mechanisms that can maintain fairness in CCA under long sensing times. Some embodiments for primary communication channel utilize or otherwise leverage backoff slots rather than extending an inter-frame spacing (IFS) time (e.g., short inter-frame spacing (SIFS) time or arbitration inter-frame spacing (AIFS) time) in order to cope with longer sensing times for 802.11ax physical layer convergence procedure (PLCP) protocol data unit (PPDU). In addition or in other embodiments, a dynamic backoff resuming scheme can be implemented, so that unfairness issues may be resolved. For primary channel and a secondary channel, a mechanism described herein is proposed for when IFS time (e.g., SIFS time and/or AIFS time) plus backoff time can be smaller than a CCA sensing time Δt, for example.

In some embodiments, in order to reverse the deferral process and bring fairness to the deferral process, for example, a communication device that can communicate in accordance with IEEE 802.11ax (e.g., one of the station(s) 120 and/or AP device 102) may defer for a 802.11ax data PPDU device (e.g., a non-legacy device that may require a longer CCA sensing time) and may not defer for a legacy data PPDU device (e.g., a legacy device that may require a shorter CCA sensing time). This condition may be implemented, for example, on the primary communication channel rather than on a secondary communication channel, as described herein.

Figure 3A:
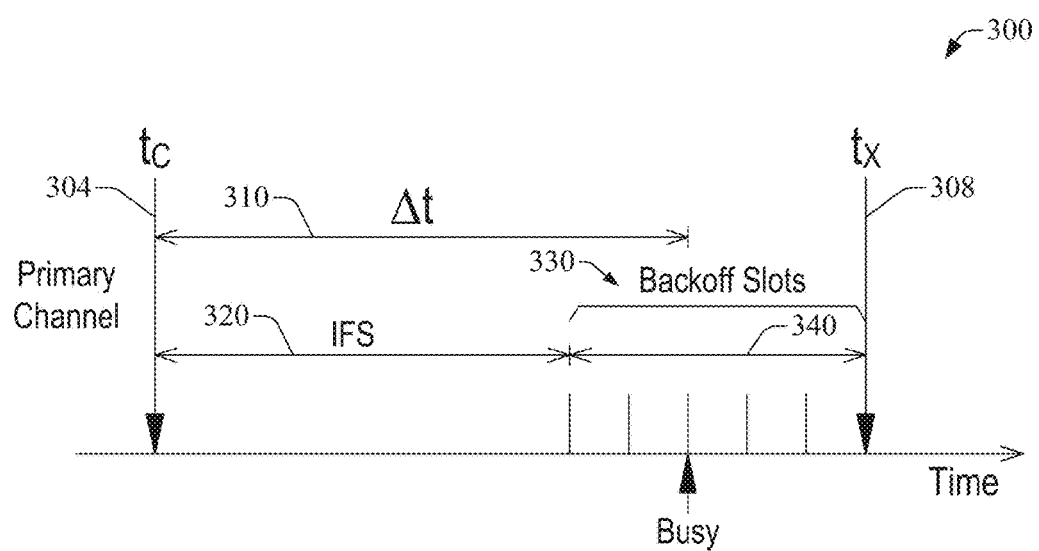
FIG. 3A illustrates an example of sensing time configuration for clear channel assessment in primary channel in accordance with one or more embodiments of the disclosure.

FIG. 3A illustrates an example backoff diagram 300 for a communication device (e.g., STA 120) that can implement CCA under long sensing time in accordance with one or more embodiments of the disclosure. As illustrated, the CCA can be implemented for a primary channel (e.g., a 20 MHz channel or a 40 MHz channel). As illustrated, in one example, a CCA sensing time Δt 310 for 802.11ax PPDU device can be longer than an IFS period 320 (e.g., SIFS time and/or AIFS time). In one example scenario, the communication device can detect a mid-packet in the primary channel at the boundary of a backoff time slot (e.g., time slot τ, represented with an arrow labeled "Busy"), as a result of CCA implementation. Accordingly, the communication device (e.g., the STA device 120) can determine that the primary channel is busy, and thus, a transmitter device (e.g., AP device 102) is busy. Therefore, in one example, the communication device can determine that the backoff slots 330 can overlap the CCA sensing time Δt 310, and can add a number of backoff slots (e.g., two backoff slots) to a backoff counter.

Figure 3B:
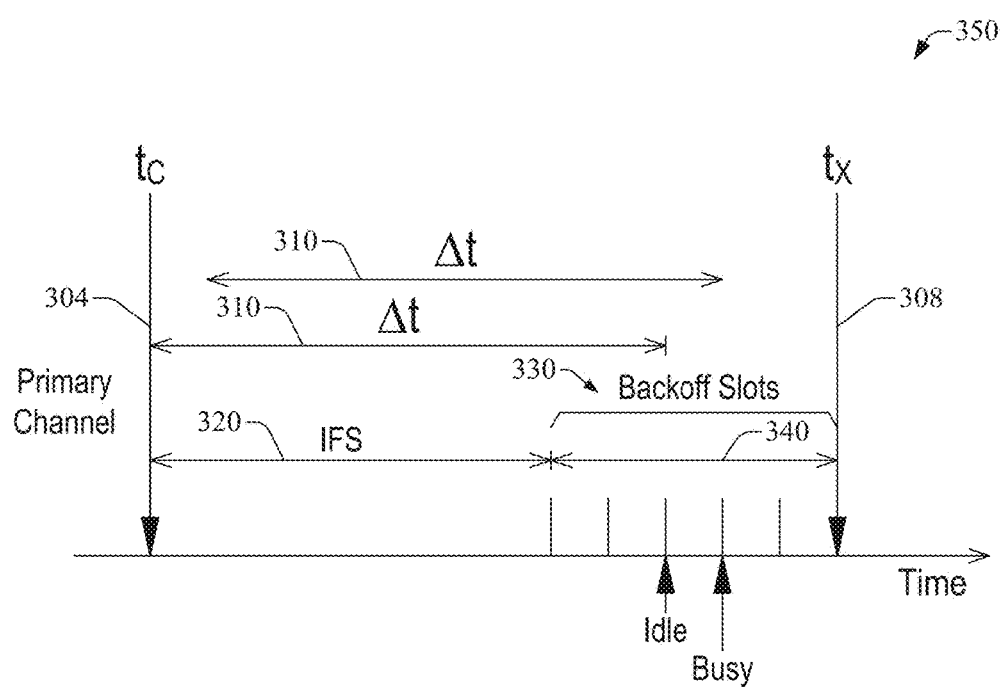
FIG. 3B illustrates an example of sensing time configurations for clear channel assessment in primary channel in accordance with one or more embodiments of the disclosure.

FIG. 3B illustrates an example backoff diagram 350 that represents an example sensing scenario in accordance with one or more embodiments of the disclosure. As described herein, CCA sensing can be a continuous operation, where a busy indication at one instance cam be based on sensing results in a past duration with length equal to a sensing interval, such as Δt 310. Specifically, in some scenarios, for a first detect that conveys "Idle" state, a backoff interval that is added back to a backoff counter can correspond to two backoff slots. In addition, for a second detect that conveys "Busy," the backoff period that is added can correspond to three backoff slots.

Figure 4:
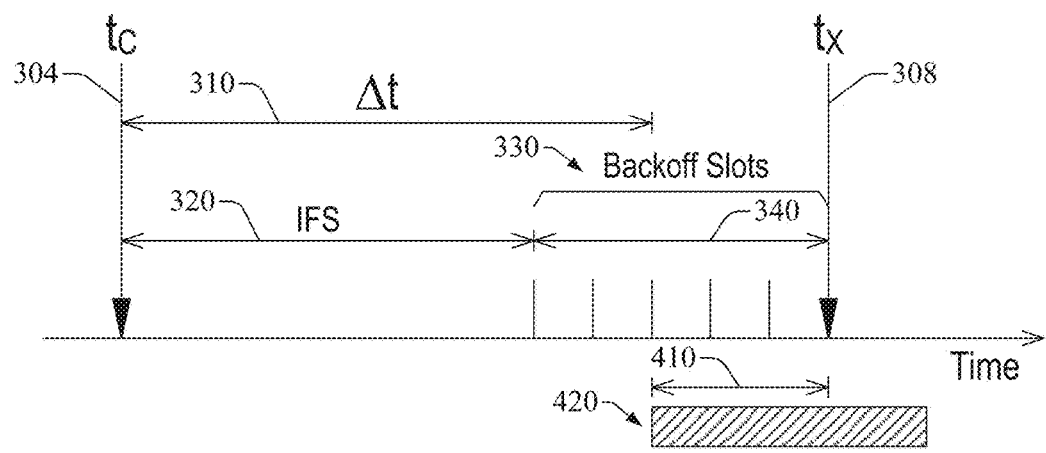
FIGS. 4-5 illustrate examples of sensing time configurations for clear channel assessment in primary channel and secondary channel in accordance with one or more embodiments of the disclosure.

Further or in some embodiments, a communication device (e.g., one of the STA device(s) 120) can resume a backoff operation in response to the CCA executed by another communication device (e.g., the AP device 102) is determined to be idle. In some embodiments, the communication device (e.g., STA device 126) may not need to augment a backoff window size 340 (e.g., an amount of time for backoff). However, in such embodiments, the communication device (e.g., STA device 126) and/or the AP device 102 may not be able to detect 802.11ax symbols 420 (e.g., data symbols) that have overlapping period 410 less than the CCA sensing time Δt 310, as shown in the example backoff diagram in FIG. 4.

Figure 5:
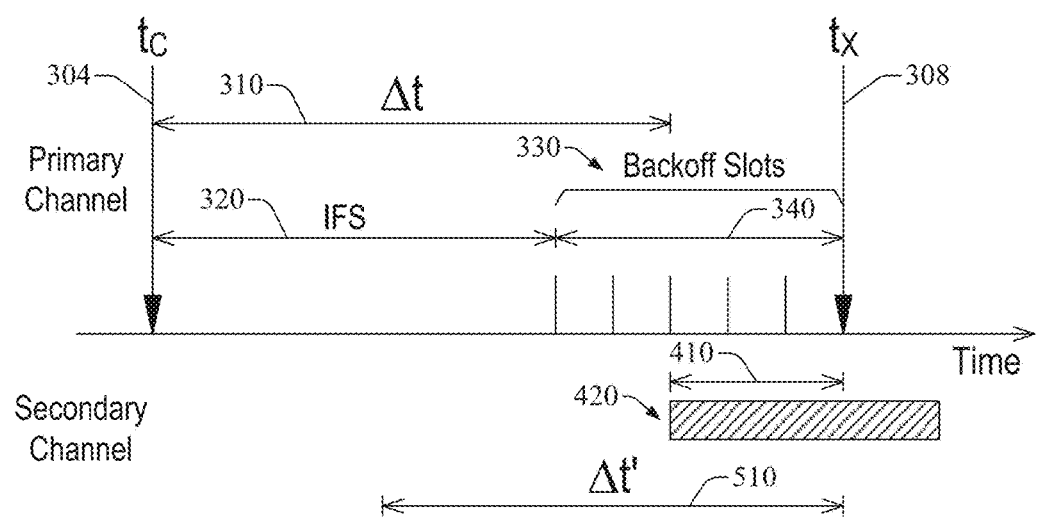

As illustrated in the backoff diagram shown in FIG. 5, in an embodiment in which the overlapping period 410 can be less than a CCA sensing time Δt' 510, mid-packet detection (MPD) mechanisms in the secondary channel may not detect other 802.11ax data symbols 420, for example. Yet, CCA can be implemented with essentially the same reliability as mid-packet detect in a secondary communication channel (or secondary channel).

Figure 6:
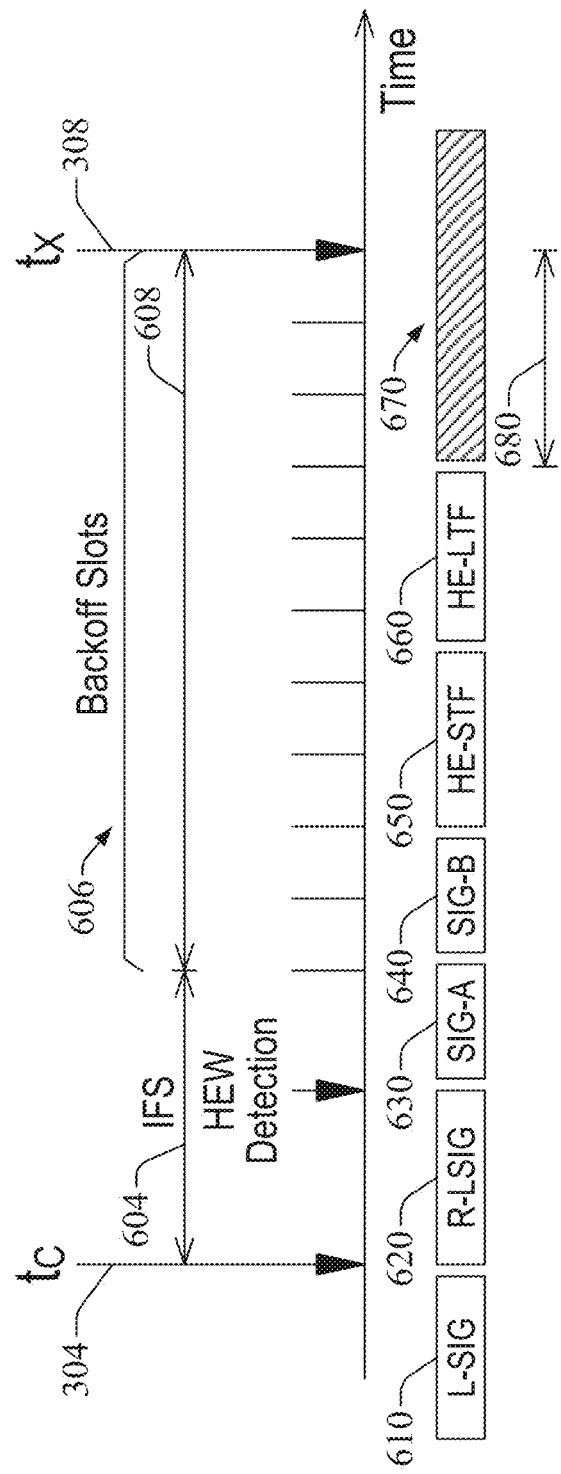
FIGS. 6-7 illustrate an example of clear channel assessment in accordance with one or more embodiments of the disclosure.

In some embodiments, when a communication device (e.g., one of the STA device(s) 120) begins contention at time $t_C$ 304, the communication device or another device communicatively coupled thereto (e.g., the AP device 102) can decode a L-SIG portion 610 of a preamble (e.g., packet header) of other 802.11ax data symbols incorrectly, as shown in FIG. 6. As such, in one example, the communication device (which can be embodied in a 802.11ax device, for example) can acquire or otherwise access a time boundary of a possible 802.11ax PPDU. Therefore, due to repeated L-SIG transmissions, for example, the communication device (e.g., an 802.11ax device) may first execute one or more R-LSIG detection operations as described in IEEE 802.11-15/0579. Hence, in one example, the communication device (e.g., 802.11ax device, which can be embodied in one of the STA device(s) 120 or the AP device 102) can acquire or otherwise determine an incoming 802.11ax signal, represented as "HEW detection" at a boundary of R-LSIG 620 in FIG. 6.

Figure 7:
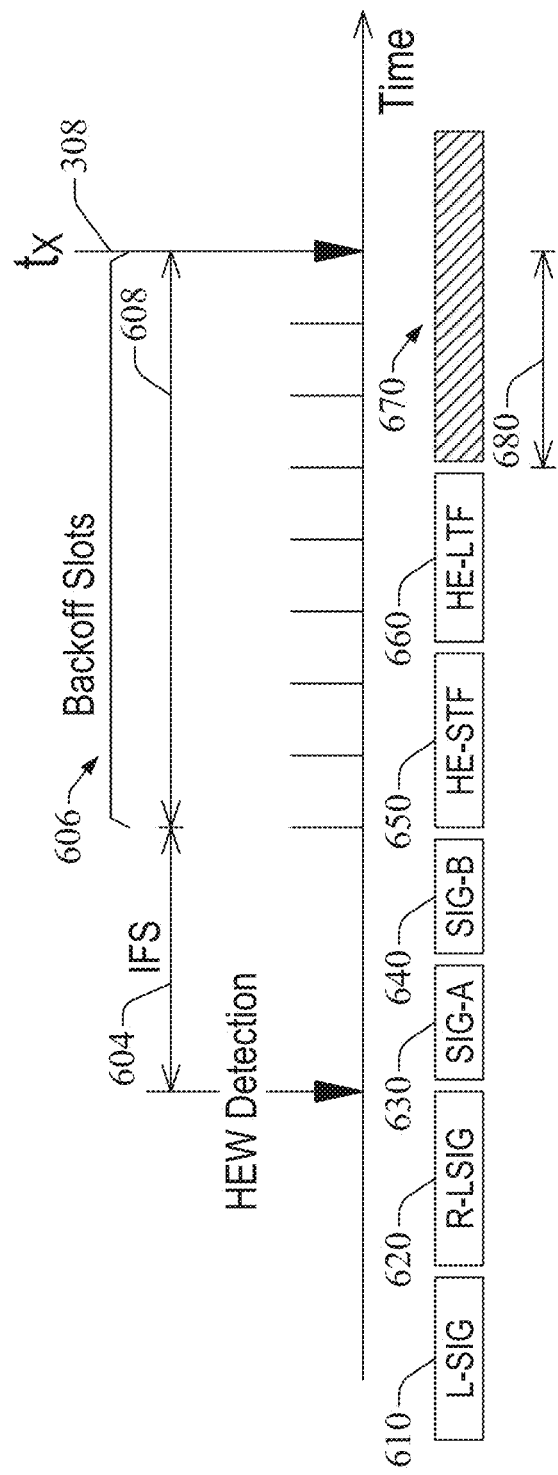

In some embodiments, an 802.11ax device (e.g., the STA 120 and/or the AP 102) that implements CCA can compare a power of each received 802.11ax signal to a defined power threshold (which can be equal to an MPD threshold, for example). In one implementation, such a comparison can be executed by the 802.11ax device in response to determining, via one or more R-LSIG 620 detection operations, the presence of the 802.11ax (or, in some embodiments, other type of Wi-Fi signals) within a primary communication channel. For example, such a device can determine that the L-SIG portion 610 of a packet header has been erroneously decoded, and can continue to decode HEW signal, which can include R-LSIG 620. In an example scenario in which a communication device ascertains or otherwise determines that a power of an 802.11ax signal (or the other type of Wi-Fi signal) present in the primary channel is less than a defined power threshold (e.g., MPD threshold), the communication device can dismiss the presence of the incoming 802.11ax signals (or the other type of incoming Wi-Fi signals) and can initiate contention at essentially the time of HEW detection, as shown in FIG. 7. HEW detection represents the decoding of the R-LSIG 620 in the HEW signal present in the primary channel. In such a scenario, in view that the power received in the detected signal is below a defined threshold, the communication device can disregard a CCA sensing time, and can proceed with contention and transmission at essentially a time $t_X$ 308.

Figure 8:
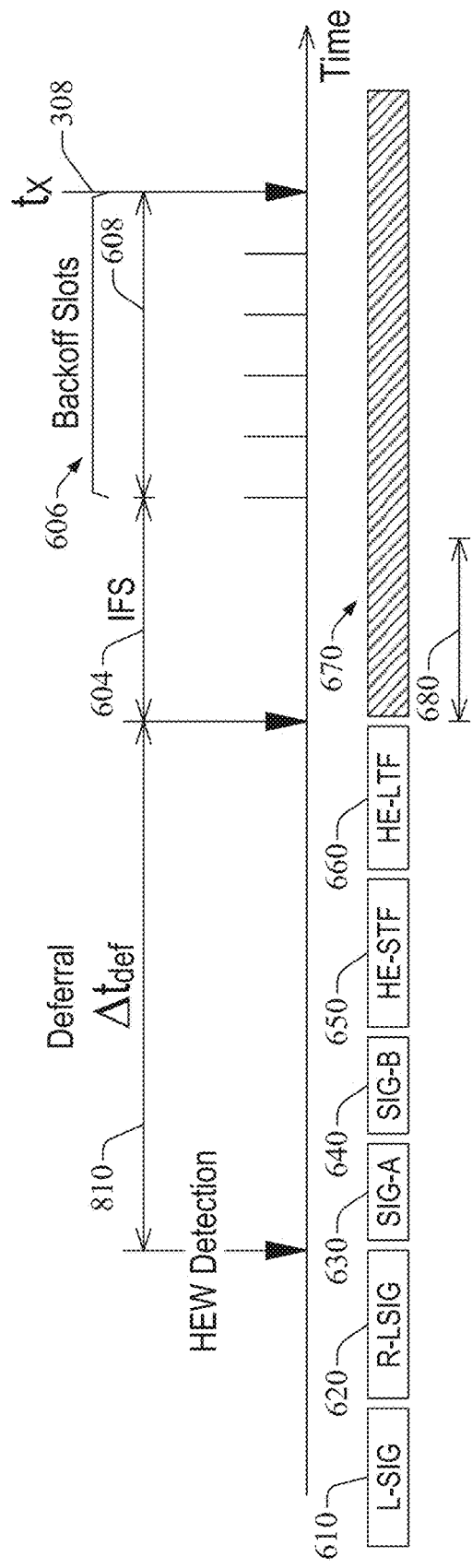
FIG. 8 illustrates an example of deferral of clear channel assessment in accordance with one or more example embodiments of the disclosure.

In addition or in the alternative, a communication device, such as an 802.11ax device, can decode signal (e.g., HEW signal) in a primary channel and can determine the power conveyed by at least a portion of such signal. More specifically, in one example, the signal can be embodied in IEEE 802.11ax signal and the communication device can detect an R-LSIG 620 of the HEW signal (noted as "HEW Dectection" in FIG. 8). In addition, the communication device can ascertain or otherwise determine that the power of an IEEE 802.11ax signal present in the primary channel is greater than a defined power threshold (e.g., the MPD threshold, which can be expressed in dBm). Therefore, in one implementation, the communication device (e.g., an 802.11ax device) can defer communications or operations for a defined deferral period $\Delta t_{def}$ 810, as illustrated in FIG. 8, where the communication device can initiate contention. After the deferral period, the communication device also can initiate or can continue CCA in accordance with aspects of this disclosure, relying on backoffslots 606, for example. As illustrated, an IFS 604 can be associated with such a contention, where the IFS 604 depends of the type of frame detected at HEW detection. In one embodiment, the communication device or a component thereof (e.g., a processor or other circuitry) can determine the deferral period $\Delta t_{def}$ 810 based on the frame structure of the HEW signal including the detected R-LSIG 620. Specifically, the deferral period $\Delta t_{def}$ 810 can be estimated to be or can be essentially equal to the interval spanned by SIG-A 630, SIG-B 640, HE-STF 650, HE-LTF 660, and/or can include other interval spanned by other field(s) of a packet header, as illustrated in FIG. 8. As described herein, the communication device can defer contention and/or CCA under long sensing time during the deferral period $\Delta t_{def}$.

Figure 9:
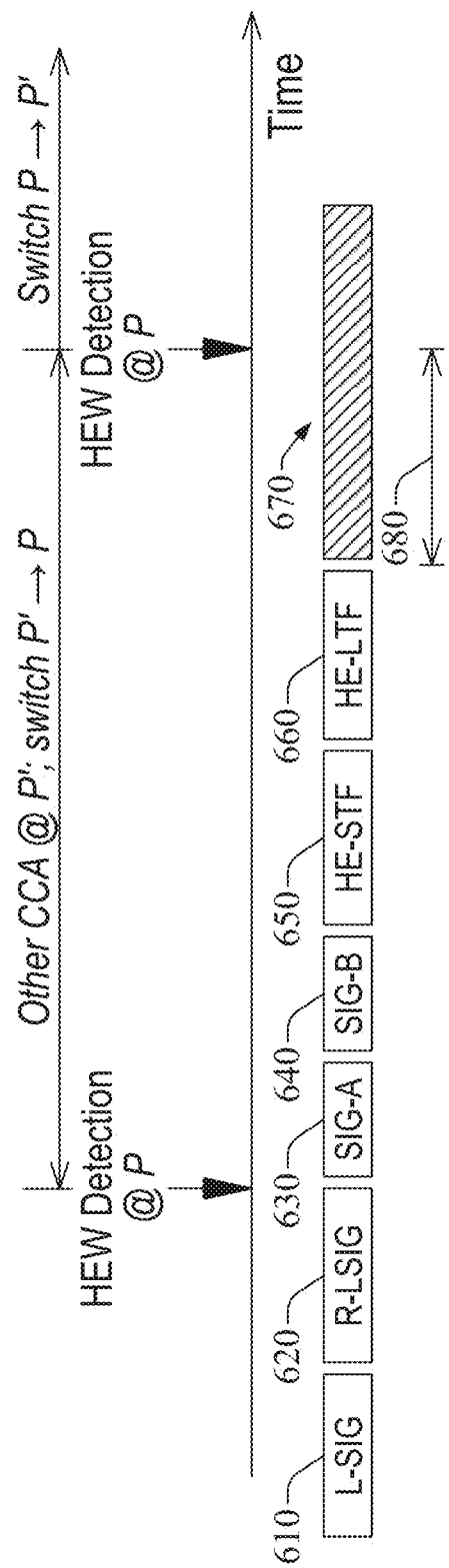
FIG. 9 illustrates an example resolution of overlapping sensing time for fairness in clear channel assessment in accordance with one or more embodiments of the disclosure.

Further, instead of deferring for a defined period $\Delta t_{def}$ when which a communication device, such as an 802.11ax device, ascertains or otherwise determines that the power of an 802.11ax signal present in the primary channel is greater than a defined power threshold (e.g., the MPD threshold P, which can be expressed in dBm), the communication device (e.g., an 802.11ax device) can change another power threshold P' (which also can be expressed in dBm) associated with an energy detect process of performing CCA threshold to the MPD threshold (e.g., P dBm) until correlation-based process (e.g., GI correlation process in FIG. 2 (or MPD)) of performing CCA for 802.11ax communications can identify or otherwise determine presence of an 802.11ax data symbol having a power that is equal to or greater than the MPD threshold P dBm, as illustrated in FIG. 9.

Figure 10:
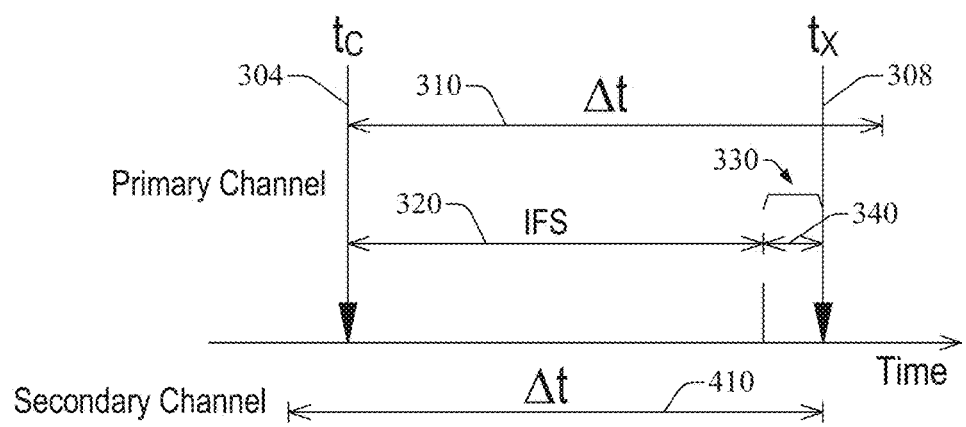
FIG. 10 illustrates an example of a sensing time and backoff configuration for fairness in clear channel assessment in accordance with one or more embodiments of the disclosure.

Further, some embodiments of the disclosure can permit implementation of CCA for primary channel and secondary channel operation. Note that the problem of longer CCA sensing time may be resolved in a secondary channel as long as the length of an IFS interval 320 plus duration 340 of backoff slots 330 is greater than the CCA sensing time Δt 310, as illustrated in FIG. 10. However, the length of the IFS interval 320 plus duration 340 of backoff slots 330 may be less than the CCA sensing time Δt 310, which may pose as a problem for both primary and secondary channels as illustrated in FIG. 10. For example, the CCA sensing time Δt 310 can be 61 μs, and the IFS interval 320 can be 25 μs (e.g., for each backoff slot). In such an example, a communication device can execute or otherwise implement operations associated with determining whether the duration 340 of the backoff slots 330 amounts to less than four times the CCA sensing time Δt 310 (e.g., less than 100 μs). Hence, in one aspect, for MPD sensing on primary channel and secondary channel, the following options can be implemented.

In a scenario in which the IFS interval 320 plus a duration 340 associated with a number of backoff slots 330 is less than the CCA sensing time Δt 310, a communication device (e.g., an 802.11ax device) can extend the IFS interval 320 to an extended IFS interval, where the extended IFS interval 320 plus the duration 340 associated with the number of backoff slots 330 is greater than the CCA sensing time Δt 310. In addition or in other embodiments, the communication device (e.g., the 802.11ax device) can disregard the MPD condition indicative or otherwise representative of a Wi-Fi signal in the primary channel and/or secondary channel. Further or in yet other embodiments, the communication device (e.g., the 802.11ax device) can utilize or otherwise leverage a shorter CCA sensing time. In such embodiments, reliability issues may arise due to, for example, the reduced sensing time.

In addition, for the secondary channel, a communication device (e.g., an 802.11ax device) can select a communication option in which transmission on the secondary channel is avoided in response to the IFS interval 320 combined with the duration 340 of the backoff slots 330 is less than the CCA sensing time Δt 310.

For the primary channel, a communication device (e.g., an 802.11ax device) can extend backoff slot time durations in order to ensure that the CCA sensing time Δt 310 can be spanned by the combination of the IFS interval 320 and the cumulative interval of such durations. As such, an extended duration of the backoff slots can be at least as long as the CCA sensing time Δt 310. In some embodiments, for the primary channel, the communication device (e.g., the 802.11ax device) can configure the time durations of backoff slots, and can therefore generate updated backoff slot time durations. For each updated backoff slot time duration, for example, when the IFS interval 320 plus the reconfigured backoff slots is greater than CCA sensing time Δt 310, the communication device may cease to configure updated time durations. Conversely, if the IFS interval 320 plus the updated backoff slots durations is less than the CCA sensing time Δt 310, then the communication device can proceed as described herein in order to achieve a combined interval, including the IFS interval 320 and the updated backoff slots, that is greater than CCA sensing time Δt 310.

It is noted that in some embodiments, the IFS interval 320 can be larger than a distributed coordination function (DCF) interframe spacing (DIFS) (e.g., 34 μs) for data transmission. It is further noted that a communication device (e.g., an 802.11ax device) may have at least one backoff slot, which may increase the duration of time (e.g., 43 μs). Hence, in one example, in response to the CCA sensing time Δt 310 being reduced to 43 μs, the communication device (e.g., the 802.11ax device) may be able to process or otherwise implement most of the data transmission. Otherwise, in response to the CCA sensing time Δt 310 being larger, e.g., Δt=61 μs, then the communication device (e.g., the 802.11ax device) may have a number of backoff slots that is less than three, which may be an unlikely implementation.

In addition or in other embodiments, deferral of communications may be toggled on and/or off. In one example, in view that a CCA implementation may rely or otherwise utilized guard interval (GI) correlation and that 802.11ax data symbols may have 4 times the symbol duration (e.g., 12.8 μs) of conventional Wi-Fi signals, deferral of communications may be enabled and/or disabled by turning on or off GI correlation for four times symbol duration (e.g., 12.8 μs). Similarly, deferral of communications specific to legacy symbol duration (e.g., 3.2 μs) may be enabled and/or disabled by turning on or off GI correlation for legacy symbol duration. Further or in other embodiments, in view that legacy devices may not defer for 802.11ax PPDU on the primary channel, GI correlation of legacy symbol duration of 802.11ax devices may also be disabled on the primary channel.

In connection with the secondary channel, 802.11ac design can be affected by the same unfairness issue, and thus, an MPD mechanism may be added for wireless communications according to such a protocol. Hence, in some embodiments, following the same design principle, GI correlation of legacy symbol duration on the secondary channel may be enabled. Accordingly, 802.11ax devices may only turn on GI correlation of 4 times symbol (e.g., 12.8 μs) on the primary channel, and turn on GI correlation of 4 times symbol (12.8 μs) and legacy symbol (3.2 μs) on the secondary channel.

Figure 11:
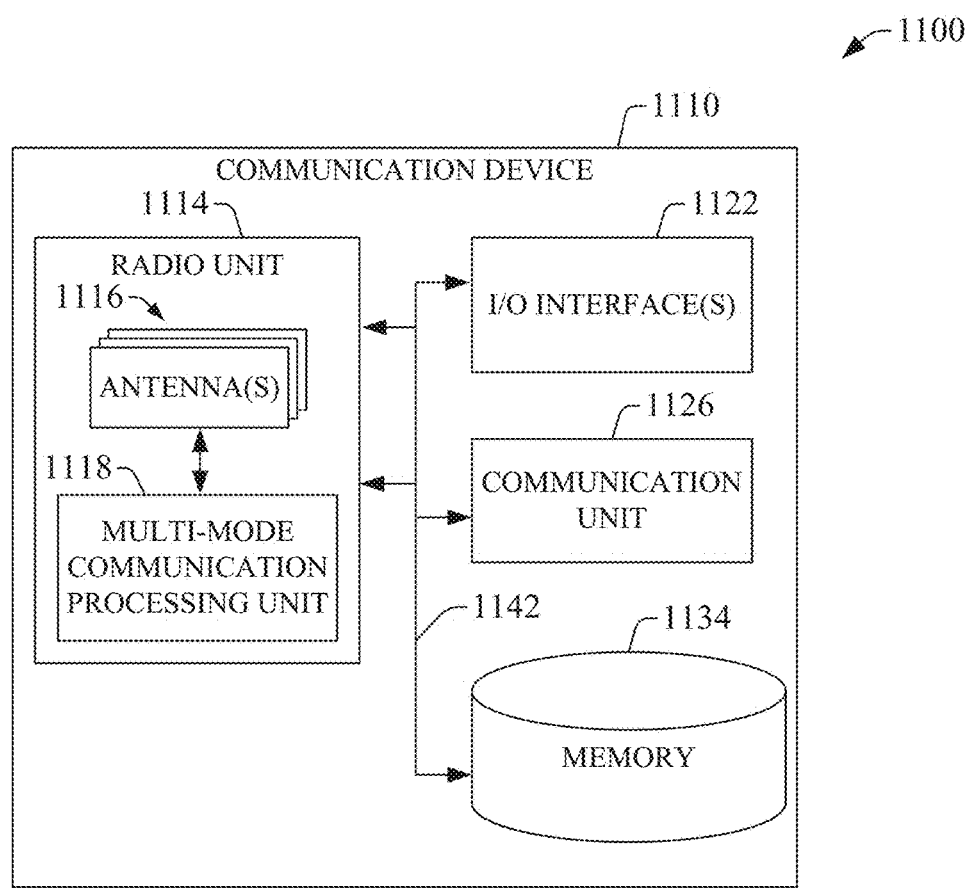
FIG. 11 depicts an example of a communication device according to one or more embodiments of the disclosure.

FIG. 11 illustrates a block-diagram of an example embodiment 1100 of a computing device 1110 that can operate in accordance with at least certain aspects of the disclosure. In one aspect, the computing device 1110 can operate as a wireless device and can embody or can comprise an access point (e.g., access point 102), a mobile computing device (e.g., user device 120 and/or STA 120), a receiving and/or transmitting station, and/or other types of communication device that can transmit and/or receive wireless communications in accordance with this disclosure. To permit wireless communication, including dynamic bit mapping techniques as described herein, the computing device 1110 includes a radio unit 1114 and a communication unit 1126. In certain implementations, the communication unit 1126 can generate data packets or other types of information blocks via a network stack, for example, and can convey data packets or other types of information block to the radio unit 1114 for wireless communication. In one embodiment, the network stack (not shown) can be embodied in or can constitute a library or other types of programming module, and the communication unit 1126 can execute the network stack in order to generate a data packet or another type of information block (e.g., a trigger frame). Generation of a data packet or an information block can include, for example, generation of control information (e.g., checksum data, communication address(es)), traffic information (e.g., payload data), scheduling information (e.g., station information, allocation information, and/or the like), an indication, and/or formatting of such information into a specific packet header and/or preamble.

Figure 12:
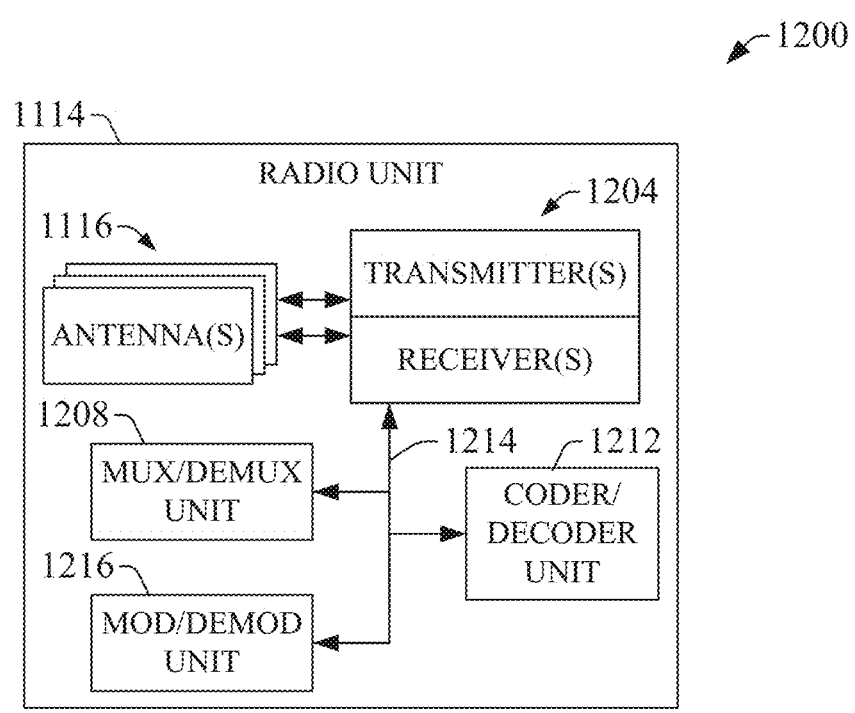
FIG. 12 depicts an example of a radio unit that is integrated into communications devices according to one or more embodiments of the disclosure.

As illustrated, the radio unit 1114 can include one or more antennas 1116 and a multi-mode communication processing unit 1118. In certain embodiments, the antenna(s) 1116 can be embodied in or can include directional or omnidirectional antennas, including, for example, dipole antennas, monopole antennas, patch antennas, loop antennas, microstrip antennas, non-directional antennas, folded dipole antennas, MIMO antennas, a combination thereof, or other types of antennas suitable for transmission of RF signals. In addition, or in other embodiments, at least some of the antenna(s) 1116 can be physically separated to leverage spatial diversity and related different channel characteristics associated with such diversity. In addition or in other embodiments, the multi-mode communication processing unit 1118 that can process at least wireless signals in accordance with one or more radio technology protocols and/or modes (such as MIMO, MU-MIMO (e.g., multiple user-MIMO), single-input-multiple-output (SIMO), multiple-input-single-output (MISO), and the like. Each of such protocol(s) can be configured to communicate (e.g., transmit, receive, or exchange) data, metadata, and/or signaling over a specific air interface. The one or more radio technology protocols can include 3GPP UMTS; LTE; LTE-A; Wi-Fi protocols, such as those of the Institute of Electrical and Electronics Engineers (IEEE) 802.11 family of standards; Worldwide Interoperability for Microwave Access (WiMAX); radio technologies and related protocols for ad hoc networks, such as Bluetooth or ZigBee; other protocols for packetized wireless communication; or the like). The multi-mode communication processing unit 1118 also can process non-wireless signals (analogic, digital, a combination thereof, or the like). In one embodiment (e.g., example embodiment 1200 shown in FIG. 12), the multi-mode communication processing unit 1118 can comprise a set of one or more transmitters/receivers 1104, and components therein (amplifiers, filters, analog-to-digital (A/D) converters, etc.), functionally coupled to a multiplexer/demultiplexer (mux/demux) unit 1208, a modulator/demodulator (mod/demod) unit 1216 (also referred to as modem 1216), and an encoder/decoder unit 1212 (also referred to as codec 1212). Each of the transmitter(s)/receiver(s) can form respective transceiver(s) that can transmit and receive wireless signal (e.g., streams, electromagnetic radiation) via the one or more antennas 1116. It should be appreciated that in other embodiments, the multi-mode communication processing unit 1118 can include other functional elements, such as one or more sensors, a sensor hub, an offload engine or unit, a combination thereof, or the like.

Electronic components and associated circuitry, such as mux/demux unit 1208, codec 1212, and modem 1216 can permit or facilitate processing and manipulation, e.g., coding/decoding, deciphering, and/or modulation/demodulation, of signal(s) received by the computing device 1110 and signal(s) to be transmitted by the computing device 1110. In one aspect, as described herein, received and transmitted wireless signals can be modulated and/or coded, or otherwise processed, in accordance with one or more radio technology protocols. Such radio technology protocol(s) can include 3GPP UMTS; 3GPP LTE; LTE-A; Wi-Fi protocols, such as IEEE 802.11 family of standards (IEEE 802.ac, IEEE 802.ax, and the like); WiMAX; radio technologies and related protocols for ad hoc networks, such as Bluetooth or ZigBee; other protocols for packetized wireless communication; or the like.

The electronic components in the described communication unit, including the one or more transmitters/receivers 1204, can exchange information (e.g., data packets, allocation information, data, metadata, code instructions, signaling and related payload data, multicast frames, combinations thereof, or the like) through a bus 1214, which can embody or can comprise at least one of a system bus, an address bus, a data bus, a message bus, a reference link or interface, a combination thereof, or the like. Each of the one or more receivers/transmitters 1204 can convert signal from analog to digital and vice versa. In addition or in the alternative, the receiver(s)/transmitter(s) 1204 can divide a single data stream into multiple parallel data streams, or perform the reciprocal operation. Such operations may be conducted as part of various multiplexing schemes. As illustrated, the mux/demux unit 1208 is functionally coupled to the one or more receivers/transmitters 1204 and can permit processing of signals in time and frequency domain. In one aspect, the mux/demux unit 1208 can multiplex and demultiplex information (e.g., data, metadata, and/or signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition or in the alternative, in another aspect, the mux/demux unit 1208 can scramble and spread information (e.g., codes) according to most any code, such as Hadamard-Walsh codes, Baker codes, Kasami codes, polyphase codes, and the like. The modem 1216 can modulate and demodulate information (e.g., data, metadata, signaling, or a combination thereof) according to various modulation techniques, such as OFDMA, OCDA, ECDA, frequency modulation (e.g., frequency-shift keying), amplitude modulation (e.g., M-ary quadrature amplitude modulation (QAM), with M a positive integer; amplitude-shift keying (ASK)), phase-shift keying (PSK), and the like). In addition, processor(s) that can be included in the computing device 1110 (e.g., processor(s) included in the radio unit 1114 or other functional element(s) of the computing device 1110) can permit processing data (e.g., symbols, bits, or chips) for multiplexing/demultiplexing, modulation/demodulation (such as implementing direct and inverse fast Fourier transforms) selection of modulation rates, selection of data packet formats, inter-packet times, and the like.

The codec 1212 can operate on information (e.g., data, metadata, signaling, or a combination thereof) in accordance with one or more coding/decoding schemes suitable for communication, at least in part, through the one or more transceivers formed from respective transmitter(s)/receiver(s) 1204. In one aspect, such coding/decoding schemes, or related procedure(s), can be retained as a group of one or more computer-accessible instructions (computer-readable instructions, computer-executable instructions, or a combination thereof) in one or more memory devices 1134 (referred to as memory 1134). In a scenario in which wireless communication among the computing device 1110 and another computing device (e.g., an access point 102, a user device 120, an STA 120, and/or other types of user equipment) utilizes MU-MIMI, MIMO, MISO, SIMO, or SISO operation, the codec 1212 can implement at least one of space-time block coding (STBC) and associated decoding, or space-frequency block (SFBC) coding and associated decoding. In addition or in the alternative, the codec 1212 can extract information from data streams coded in accordance with spatial multiplexing scheme. In one aspect, to decode received information (e.g., data, metadata, signaling, or a combination thereof), the codec 1212 can implement at least one of computation of log-likelihood ratios (LLR) associated with constellation realization for a specific demodulation; maximal ratio combining (MRC) filtering, maximum-likelihood (ML) detection, successive interference cancellation (SIC) detection, zero forcing (ZF) and minimum mean square error estimation (MMSE) detection, or the like. The codec 1212 can utilize, at least in part, mux/demux component 1208 and mod/demod component 1216 to operate in accordance with aspects described herein.

The computing device 1110 can operate in a variety of wireless environments having wireless signals conveyed in different electromagnetic radiation (EM) frequency bands and/or subbands. To at least such end, the multi-mode communication processing unit 1118 in accordance with aspects of the disclosure can process (code, decode, format, etc.) wireless signals within a set of one or more EM frequency bands (also referred to as frequency bands) comprising one or more of radio frequency (RF) portions of the EM spectrum, microwave portion(s) of the EM spectrum, or infrared (IR) portion of the EM spectrum. In one aspect, the set of one or more frequency bands can include at least one of (i) all or most licensed EM frequency bands, (such as the industrial, scientific, and medical (ISM) bands, including the 2.4 GHz band or the 5 GHz bands); or (ii) all or most unlicensed frequency bands (such as the 60 GHz band) currently available for telecommunication.

The computing device 1110 can receive and/or transmit information encoded and/or modulated or otherwise processed in accordance with aspects of the present disclosure.

To at least such an end, in certain embodiments, the computing device 1110 can acquire or otherwise access information, wirelessly via the radio unit 1114 (also referred to as radio 1114), where at least a portion of such information can be encoded and/or modulated in accordance with aspects described herein. More specifically, for example, the information can include prefixes, data packets, and/or physical layer headers (e.g., preambles and included information such as allocation information), a signal, and/or the like in accordance with embodiments of the disclosure, such as those shown in FIGS. 1-12.

The memory 1134 can contain one or more memory elements having information suitable for processing information received according to a predetermined communication protocol (e.g., IEEE 802.11ac or IEEE 802.11ax). While not shown, in certain embodiments, one or more memory elements of the memory 1134 can include computer-accessible instructions that can be executed by one or more of the functional elements of the computing device 1110 in order to implement at least some of the functionality for clear channel assessment under long sensing time in accordance with aspects described herein, including processing of information communicated (e.g., encoded, modulated, and/or arranged) in accordance with aspect of the disclosure. One or more groups of such computer-accessible instructions can embody or can constitute a programming interface that can permit communication of information (e.g., data, metadata, and/or signaling) between functional elements of the computing device 1110 for implementation of such functionality.

In addition, in the illustrated computing device 1100, a bus architecture 1142 (also referred to as bus 1142) can permit the exchange of information (e.g., data, metadata, and/or signaling) between two or more of (i) the radio unit 1114 or a functional element therein, (ii) at least one of the I/O interface(s) 1122, (iii) the communication unit 1126, or (iv) the memory 1134. In addition, one or more application programming interfaces (APIs) (not depicted in FIG. 11) or other types of programming interfaces that can permit exchange of information (e.g., trigger frames, streams, data packets, allocation information, data and/or metadata) between two or more of the functional elements of the client device 1110. At least one of such API(s) can be retained or otherwise stored in the memory 1134. In certain embodiments, it should be appreciated that at least one of the API(s) or other programming interfaces can permit the exchange of information within components of the communication unit 1126. The bus 1142 also can permit a similar exchange of information.

Figure 13:
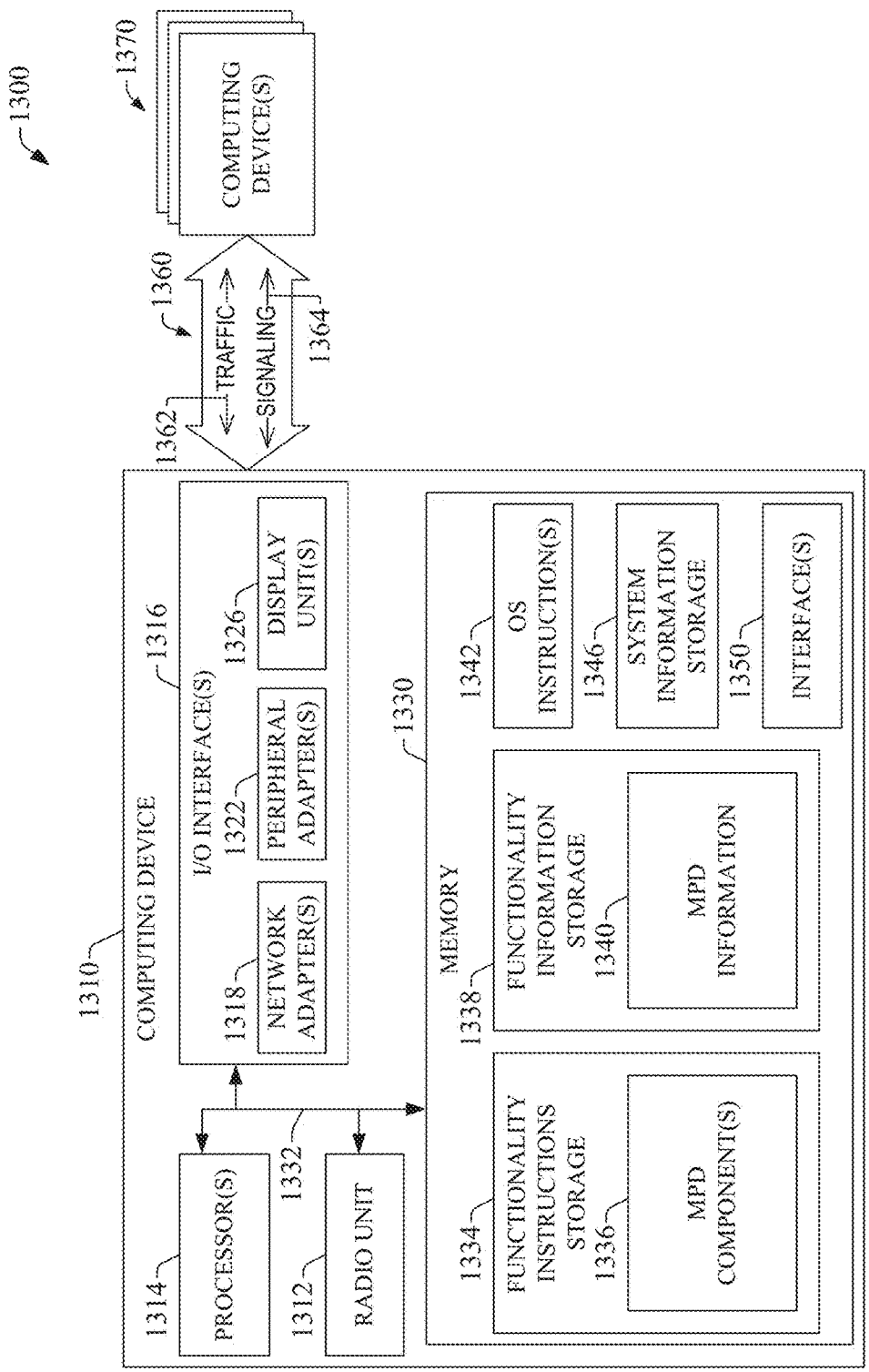
FIG. 13 depicts an example of a computational environment according to one or more embodiments of the disclosure.

FIG. 13 illustrates an example of a computational environment 1300 for clear channel assessment under long sensing time in accordance with one or more aspects of the disclosure. The example computational environment 1300 is only illustrative and is not intended to suggest or otherwise convey any limitation as to the scope of use or functionality of such computational environments' architecture. In addition, the computational environment 1300 should not be interpreted as having any dependency or requirement relating to any one or combination of components illustrated in this example computational environment. The illustrative computational environment 1300 can embody or can include, for example, the computing device 1310, an access point 102, a user device 120, and/or any other computing device that can implement or otherwise leverage the elements of clear channel assessment under long sensing time described herein.

The computational environment 1300 represents an example of a software implementation of the various aspects or features of the disclosure in which the processing or execution of operations described in connection with the clear channel assessment under long sensing time described herein, including processing of information communicated (e.g., encoded, modulated, and/or arranged) in accordance with this disclosure, can be performed in response to execution of one or more software components at the computing device 1310. It should be appreciated that the one or more software components can render the computing device 1310, or any other computing device that contains such components, a particular machine for the clear channel assessment under long sensing time in accordance with aspects described herein, including processing of information encoded, modulated, and/or arranged in accordance with aspects described herein, among other functional purposes. A software component can be embodied in or can comprise one or more computer-accessible instructions, e.g., computer-readable and/or computer-executable instructions. At least a portion of the computer-accessible instructions can embody one or more of the example techniques disclosed herein. For instance, to embody one such method, at least the portion of the computer-accessible instructions can be persisted (e.g., stored, made available, or stored and made available) in a computer storage non-transitory medium and executed by a processor. The one or more computer-accessible instructions that embody a software component can be assembled into one or more program modules, for example, that can be compiled, linked, and/or executed at the computing device 1310 or other computing devices. Generally, such program modules comprise computer code, routines, programs, objects, components, information structures (e.g., data structures and/or metadata structures), etc., that can perform particular tasks (e.g., one or more operations) in response to execution by one or more processors, which can be integrated into the computing device 1310 or functionally coupled thereto.

The various example embodiments of the disclosure can be operational with numerous other general purpose or special purpose computing system environments or configurations. Examples of well-known computing systems, environments, and/or configurations that can be suitable for implementation of various aspects or features of the disclosure in connection with the clear channel assessment under long sensing time, including processing of information communicated (e.g., encoded, modulated, and/or arranged) in accordance with features described herein, can comprise personal computers; server computers; laptop devices; handheld computing devices, such as mobile tablets; wearable computing devices; and multiprocessor systems. Additional examples can include set top boxes, programmable consumer electronics, network PCs, minicomputers, mainframe computers, blade computers, programmable logic controllers, distributed computing environments that comprise any of the above systems or devices, and the like.

As illustrated, the computing device 1310 can comprise one or more processors 1314, one or more input/output (I/O) interfaces 1316, a memory 1330, and a bus architecture 1332 (also termed bus 1332) that functionally couples various functional elements of the computing device 1310. The bus 1332 can include at least one of a system bus, a memory bus, an address bus, or a message bus, and can permit exchange of information (data, metadata, and/or signaling) between the processor(s) 1314, the I/O interface(s) 1316, and/or the memory 1330, or respective functional element therein. In certain scenarios, the bus 1332 in conjunction with one or more internal programming interfaces 1350 (also referred to as interface(s) 1350) can permit such exchange of information. In scenarios in which processor(s) 1314 include multiple processors, the computing device 1310 can utilize parallel computing.

The I/O interface(s) 1316 can permit or otherwise facilitate communication of information between the computing device and an external device, such as another computing device, e.g., a network element or an end-user device. Such communication can include direct communication or indirect communication, such as exchange of information between the computing device 1310 and the external device via a network or elements thereof. As illustrated, the I/O interface(s) 1316 can comprise one or more of network adapter(s) 1318, peripheral adapter(s) 1322, and display unit(s) 1326. Such adapter(s) can permit or facilitate connectivity between the external device and one or more of the processor(s) 1314 or the memory 1330. In one aspect, at least one of the network adapter(s) 1318 can couple functionally the computing device 1310 to one or more computing devices 1370 via one or more traffic and signaling pipes 1360 that can permit or facilitate exchange of traffic 1362 and signaling 1364 between the computing device 1310 and the one or more computing devices 1370. Such network coupling provided at least in part by the at least one of the network adapter(s) 1318 can be implemented in a wired environment, a wireless environment, or both. The information that is communicated by the at least one network adapter can result from implementation of one or more operations in a method of the disclosure. Such output can be any form of visual representation, including, but not limited to, textual, graphical, animation, audio, tactile, and the like. In certain scenarios, each access point 102, user device 120, station, and/or other device can have substantially the same architecture as the computing device 1310. In addition or in the alternative, the display unit(s) 1326 can include functional elements (e.g., lights, such as light-emitting diodes; a display, such as liquid crystal display (LCD), combinations thereof, or the like) that can permit control of the operation of the computing device 1310, or can permit conveying or revealing operational conditions of the computing device 1310.

In one aspect, the bus 1332 represents one or more of several possible types of bus structures, including a memory bus or memory controller, a peripheral bus, an accelerated graphics port, and a processor or local bus using any of a variety of bus architectures. As an illustration, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI) bus, a PCI-Express bus, a Personal Computer Memory Card Industry Association (PCMCIA) bus, Universal Serial Bus (USB), and the like. The bus 1332, and all buses described herein can be implemented over a wired or wireless network connection and each of the subsystems, including the processor(s) 1314, the memory 1330 and memory elements therein, and the I/O interface(s) 1316 can be contained within one or more remote computing devices 1370 at physically separate locations, connected through buses of this form, in effect implementing a fully distributed system.

The computing device 1310 can comprise a variety of computer-readable media. Computer readable media can be any available media (transitory and non-transitory) that can be accessed by a computing device. In one aspect, computer-readable media can comprise computer non-transitory storage media (or computer-readable non-transitory storage media) and communications media. Example computer-readable non-transitory storage media can be any available media that can be accessed by the computing device 1310, and can comprise, for example, both volatile and non-volatile media, and removable and/or non-removable media. In one aspect, the memory 1330 can comprise computer-readable media in the form of volatile memory, such as random access memory (RAM), and/or non-volatile memory, such as read only memory (ROM).

The memory 1330 can comprise functionality instructions storage 1334 and functionality information storage 1338. The functionality instructions storage 1334 can comprise computer-accessible instructions that, in response to execution (by at least one of the processor(s) 1314), can implement one or more of the functionalities of the disclosure. The computer-accessible instructions can embody or can comprise one or more software components illustrated as mid-packet detection component(s) 1336. In one scenario, execution of at least one component of the mid-packet detection component(s) 1336 can implement one or more of the techniques disclosed herein. For instance, such execution can cause a processor that executes the at least one component to carry out a disclosed example method. It should be appreciated that, in one aspect, a processor of the processor(s) 1314 that executes at least one of the mid-packet detection component(s) 1336 can retrieve information from or retain information in a memory element 1340 in the functionality information storage 1338 in order to operate in accordance with the functionality programmed or otherwise configured by the mid-packet detection component(s) 1336. Such information can include at least one of code instructions, information structures, or the like. At least one of the one or more interfaces 1350 (e.g., application programming interface(s)) can permit or facilitate communication of information between two or more components within the functionality instructions storage 1334. The information that is communicated by the at least one interface can result from implementation of one or more operations in a method of the disclosure. In certain embodiments, one or more of the functionality instructions storage 1334 and the functionality information storage 1338 can be embodied in or can comprise removable/non-removable, and/or volatile/non-volatile computer storage media.

At least a portion of at least one of the mid-packet detection component(s) 1336 or mid-packet detection information 1340 can program or otherwise configure one or more of the processors 1314 to operate at least in accordance with the functionality described herein. One or more of the processor(s) 1314 can execute at least one of such components and leverage at least a portion of the information in the storage 1338 in order to provide clear channel assessment under long sensing time in accordance with one or more aspects described herein. More specifically, yet not exclusively, execution of one or more of the component(s) 1336 can permit transmitting and/or receiving information at the computing device 1310.

It should be appreciated that, in certain scenarios, the functionality instruction(s) storage 1334 can embody or can comprise a computer-readable non-transitory storage medium having computer-accessible instructions that, in response to execution, cause at least one processor (e.g., one or more of processor(s) 1314) to perform a group of operations comprising the operations or blocks described in connection with the disclosed methods, such as example methods 1500, 1600, 1700, and 1800.

In addition, the memory 1330 can comprise computer-accessible instructions and information (e.g., data and/or metadata) that permit or facilitate operation and/or administration (e.g., upgrades, software installation, any other configuration, or the like) of the computing device 1310. Accordingly, as illustrated, the memory 1330 can comprise a memory element 1342 (labeled OS instruction(s) 1342) that contains one or more program modules that embody or include one or more OSs, such as Windows operating system, Unix, Linux, Symbian, Android, Chromium, and substantially any OS suitable for mobile computing devices or tethered computing devices. In one aspect, the operational and/or architecture complexity of the computing device 1310 can dictate a suitable OS. The memory 1330 also comprises a system information storage 1346 having data and/or metadata that permits or facilitate operation and/or administration of the computing device 1310. Elements of the OS instruction(s) 1342 and the system information storage 1346 can be accessible or can be operated on by at least one of the processor(s) 1314.

It should be recognized that while the functionality instructions storage 1334 and other executable program components, such as the operating system instruction(s) 1342, are illustrated herein as discrete blocks, such software components can reside at various times in different memory components of the computing device 1310, and can be executed by at least one of the processor(s) 1314. In certain scenarios, an implementation of mid-packet detection component(s) 1336 can be retained on or transmitted across some form of computer readable media.

The computing device 1310 and/or one of the computing device(s) 1370 can include a power supply (not shown), which can power up components or functional elements within such devices. The power supply can be a rechargeable power supply, e.g., a rechargeable battery, and it can include one or more transformers to achieve a power level suitable for operation of the computing device 1310 and/or one of the computing device(s) 1370, and components, functional elements, and related circuitry therein. In certain scenarios, the power supply can be attached to a conventional power grid to recharge and ensure that such devices can be operational. In one aspect, the power supply can include an I/O interface (e.g., one of the network adapter(s) 1318) to connect operationally to the conventional power grid. In another aspect, the power supply can include an energy conversion component, such as a solar panel, to provide additional or alternative power resources or autonomy for the computing device 1310 and/or one of the computing device(s) 1370.

The computing device 1310 can operate in a networked environment by utilizing connections to one or more remote computing devices 1370. As an illustration, a remote computing device can be a personal computer, a portable computer, a server, a router, a network computer, a peer device or other common network node, and so on. As described herein, connections (physical and/or logical) between the computing device 1310 and a computing device of the one or more remote computing devices 1370 can be made via one or more traffic and signaling pipes 1360, which can comprise wireline link(s) and/or wireless link(s) and several network elements (such as routers or switches, concentrators, servers, and the like) that form a local area network (LAN) and/or a wide area network (WAN). Such networking environments are conventional and commonplace in dwellings, offices, enterprise-wide computer networks, intranets, local area networks, and wide area networks.

Figure 14:
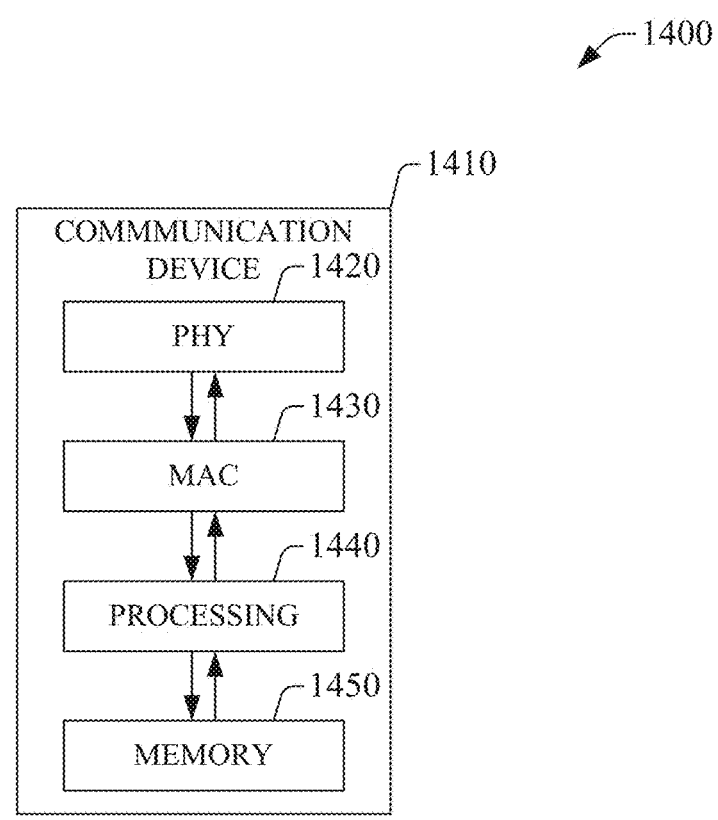
FIG. 14 depicts another example of a communication device according to one or more embodiments of the disclosure.

FIG. 14 presents another example embodiment 1400 of a computing device 1410 in accordance with one or more embodiments of the disclosure. In certain implementations, the computing device 1410 can be a HEW-compliant device that may be configured to communicate with one or more other HEW devices and/or other types of communication devices, such as legacy communication devices. HEW devices and legacy devices also may be referred to as HEW stations (STAs) and legacy STAs, respectively. In one implementation, the computing device 1410 can operate as an access point 102, a user device 120, and/or another device. As illustrated, the computing device 1410 can include, among other things, physical layer (PHY) circuitry 1420 and medium-access-control layer (MAC) circuitry 1430. In one aspect, the PHY circuitry 1410 and the MAC circuitry 1430 can be HEW compliant layers and also can be compliant with one or more legacy IEEE 802.11 standards. In one aspect, the MAC circuitry 1430 can be arranged to configure physical layer converge protocol (PLCP) protocol data units (PPDUs) and arranged to transmit and receive PPDUs, among other things. In addition or in other embodiments, the computing device 1410 also can include other hardware processing circuitry 1440 (e.g., one or more processors) and one or more memory devices 1450 configured to perform the various operations described herein.

In certain embodiments, the MAC circuitry 1430 can be arranged to contend for a wireless medium during a contention period to receive control of the medium for the HEW control period and configure an HEW PPDU. In addition or in other embodiments, the PHY 1420 can be arranged to transmit the HEW PPDU. The PHY circuitry 1420 can include circuitry for modulation/demodulation, upconversion/downconversion, filtering, amplification, etc. As such, the computing device 1410 can include a transceiver to transmit and receive data such as HEW PPDU. In certain embodiments, the hardware processing circuitry 1440 can include one or more processors. The hardware processing circuitry 1440 can be configured to perform functions based on instructions being stored in a memory device (e.g., RAM or ROM) or based on special purpose circuitry. In certain embodiments, the hardware processing circuitry 1440 can be configured to perform one or more of the functions described herein, such as activating and/or deactivating different back-off count procedures, allocating bandwidth, and/or the like.

In certain embodiments, one or more antennas may be coupled to or included in the PHY circuitry 1420. The antenna(s) can transmit and receive wireless signals, including transmission of HEW packets. As described herein, the one or more antennas can include one or more directional, non-directional antennas, or omnidirectional antennas, including dipole antennas, monopole antennas, patch antennas, loop antennas, microstrip antennas, folded dipole antennas, MIMO antennas, a combination thereof, or the like. or other types of antennas suitable for transmission of RF signals. In scenarios in which MIMO communication is utilized, the antennas may be physically separated to leverage spatial diversity and the different channel characteristics that may result.

The memory 1450 can retain or otherwise store information for configuring the other circuitry to perform operations for configuring and transmitting HEW packets and performing the various operations described herein including the allocation of and using of bandwidth (AP) and using the allocation of the bandwidth (STA).

The computing device 1410 can be configured to communicate using OFDM communication signals over a multicarrier communication channel. More specifically, in certain embodiments, the computing device 1410 can be configured to communicate in accordance with one or more specific radio technology protocols, such as the IEEE family of standards including IEEE 802.11-2012, IEEE 802.11n-

2009, IEEE 802.11ac-2013, IEEE 802.11ax, DensiFi, and/or proposed specifications for WLANs. In one of such embodiments, the computing device 1410 can utilize or otherwise rely on symbols having a duration that is four times the symbol duration of IEEE 802.11n and/or IEEE 802.11ac. It should be appreciated that the disclosure is not limited in this respect and, in certain embodiments, the computing device 1410 also can transmit and/or receive wireless communications in accordance with other protocols and/or standards.

The computing device 1410 can be embodied in or can constitute a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), an access point, a base station, a transmit/receive device for a wireless standard such as IEEE 802.11 or IEEE 802.16, or other types of communication device that may receive and/or transmit information wirelessly. Similarly to the computing device 110, the computing device 1410 can include, for example, one or more of a keyboard, a display, a non-volatile memory port, multiple antennas, a graphics processor, an application processor, speakers, and other mobile device elements. The display may be an LCD screen including a touch screen.

It should be appreciated that while the computing device 1410 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In certain embodiments, the functional elements may refer to one or more processes operating or otherwise executing on one or more processors.

In view of the aspects described herein, various techniques for performing clear channel assessment under a long sensing interval can be implemented in accordance with the disclosure. Such techniques can provide fairness in the utilization of wireless communication resources among communication devices. Examples of such techniques can be better appreciated with reference, for example, to the flowcharts in FIGS. 15-18. More specifically, such each of such figures illustrates example methods for performing clear channel assessment according to one or more embodiments of the disclosure. For purposes of simplicity of explanation, the example method disclosed herein is presented and described as a series of blocks (with each block representing an action or an operation in a method, for example). However, it is to be understood and appreciated that the disclosed method is not limited by the order of blocks and associated actions or operations, as some blocks may occur in different orders and/or concurrently with other blocks from those that are shown and described herein. For example, the various methods (or processes or techniques) in accordance with this disclosure can be alternatively represented as a series of interrelated states or events, such as in a state diagram. Furthermore, not all illustrated blocks, and associated action(s), may be required to implement a method in accordance with one or more aspects of the disclosure. Further yet, two or more of the disclosed methods or processes can be implemented in combination with each other, to accomplish one or more features or advantages described herein.

It should be appreciated that the techniques of the disclosure can be retained on an article of manufacture, or computer-readable medium, to permit or facilitate transporting and transferring such methods to a computing device (e.g., a desktop computer; a mobile computer, such as a tablet, or a smartphone; a gaming console, a mobile telephone; a blade computer; a programmable logic controller, and the like) for execution, and thus implementation, by a processor of the computing device or for storage in a memory thereof or functionally coupled thereto. In one aspect, one or more processors, such as processor(s) that implement (e.g., execute) one or more of the disclosed techniques, can be employed to execute code instructions retained in a memory, or any computer- or machine-readable medium, to implement the one or more methods. The code instructions can provide a computer-executable or machine-executable framework to implement the techniques described herein.

Figure 15:
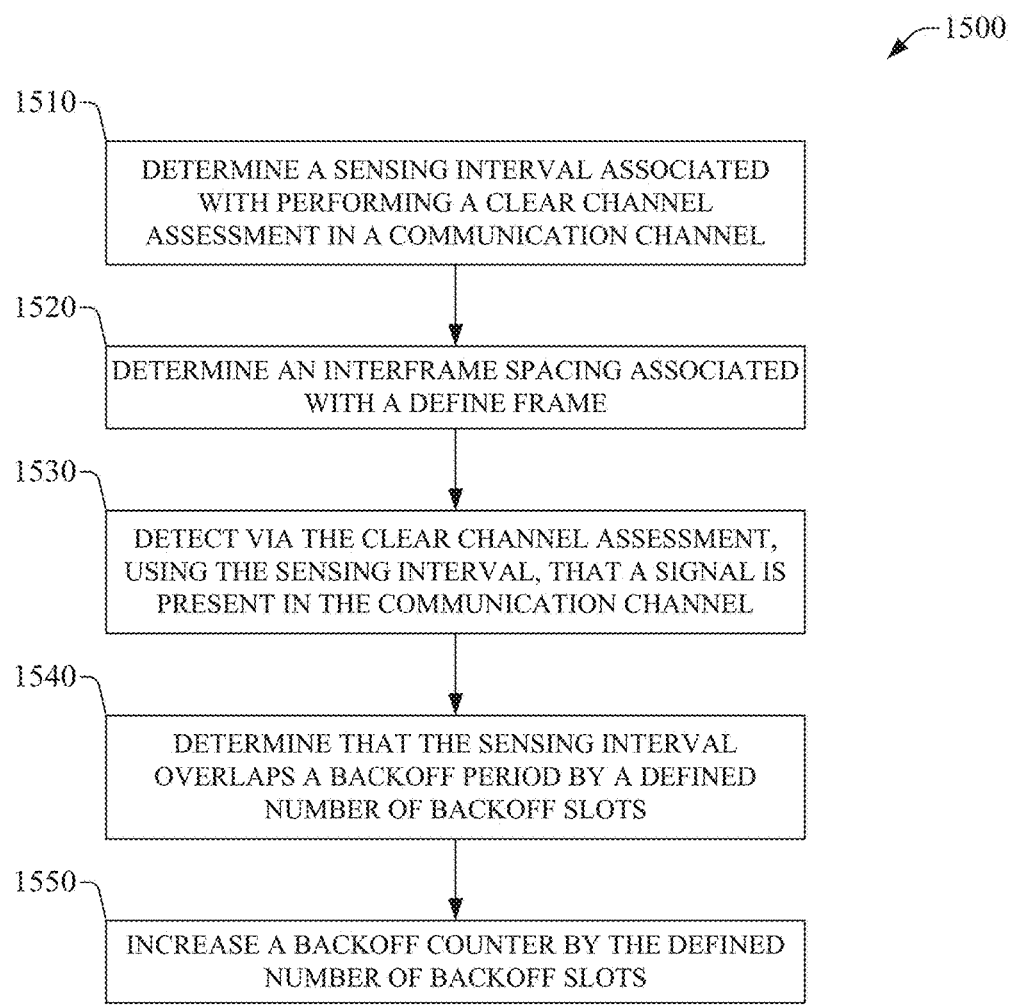
FIGS. 15-18 illustrate example methods for performing clear channel assessment according to one or more embodiments of the disclosure.

FIG. 15 illustrates an example method 1500 for performing clear assessment channel in accordance with one or more embodiments of the disclosure. As described herein, the example method 1500 can be performed entirely or partially by a communication device that can receive wireless signal (e.g., HEW signals and/or legacy signals). In some embodiments, or one or more components of the communication device (e.g., circuitry or other types of processors). At block 1510, the communication device can determine or otherwise configure a sensing interval (e.g., $\Delta t$ described herein) associated with performing a clear channel assessment in a communication (e.g., a primary channel or a secondary channel). At block 1520, the communication device can determine an interframe spacing (e.g., SIFS, DIFS, AIFS, or the like) associated with a defined frame, such as a control frame or a data frame. At block 1530, the communication device can detect, via the clear channel assessment, using the sensing interval, that a signal is present in the communication channel. At block 1540, the communication device can determine that the sensing interval (e.g., $\Delta t$) overlaps a backoff period (or, in some embodiments, a contention window) by a defined number of backoff slots. At block 1550, the communication device can increase a backoff counter by the defined number of backoff slots (e.g., two slots in the embodiment shown and described in connection with FIG. 3A).

Figure 16:
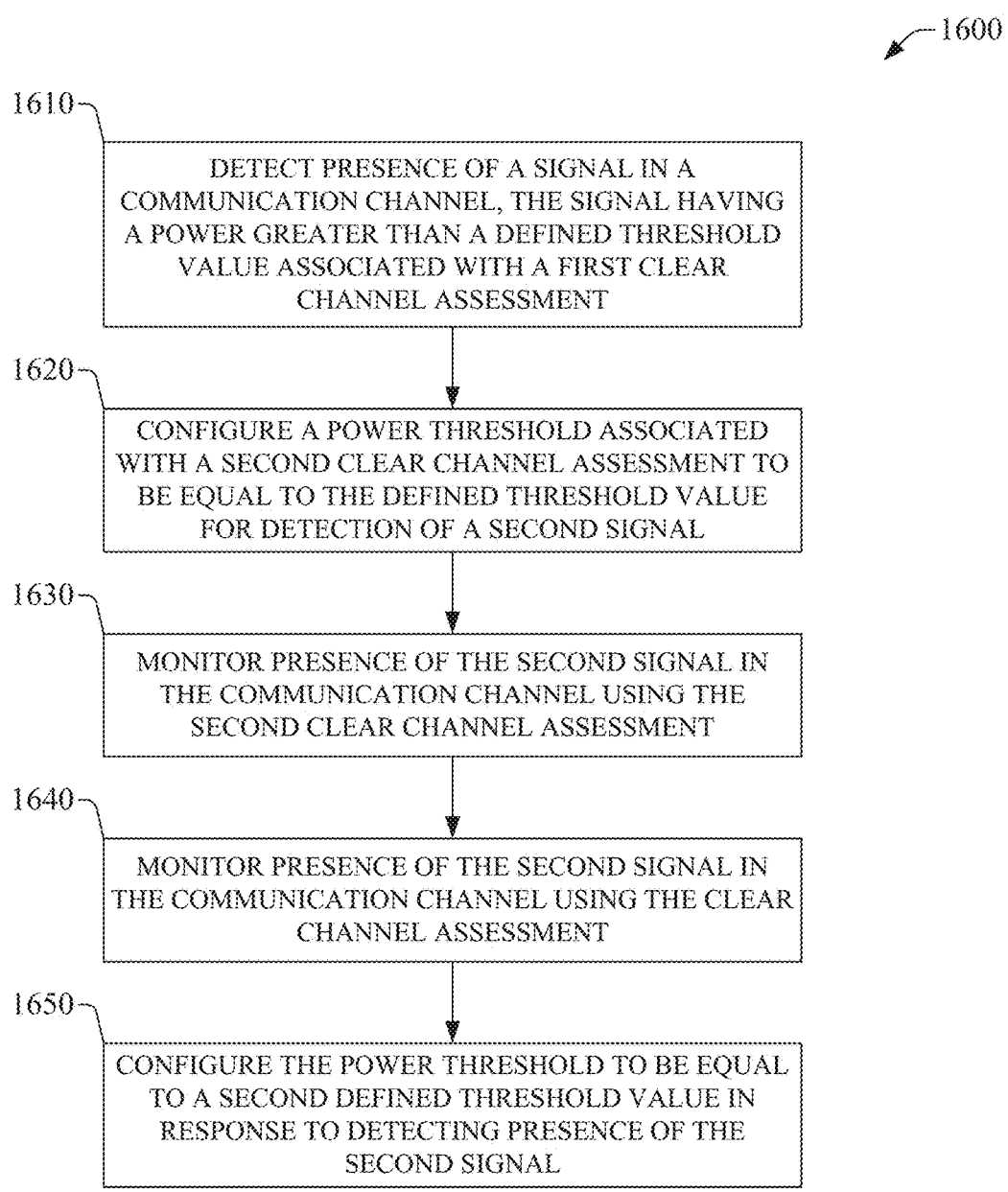

FIG. 16 illustrates an example method 1600 for performing channel assessment in accordance with one or more embodiments of the disclosure. A communication device or one or more components therein (e.g., circuitry or other types of processors) in accordance with aspects of this disclosure can implement (e.g., execute) the example method 1600 partially or in its entirety. In some embodiments, the communication device is embodied in or can constitute one of the device(s) 120. At block 1610, the communication device can detect present of a signal in a communication channel (e.g., a primary channel in 802.11ax), where at least a portion of the signal can have a power greater than a defined threshold value (e.g., P dBm) associated with a first clear channel assessment (e.g., MPD mechanism). At block 1620, the communication device can configure a power threshold associated with a second clear channel assessment (e.g., energy detect mechanism) to be equal to the defined threshold value for detection of a second signal. It is noted that the second signal can be embodied in or can correspond to a portion of the signal present in the communication channel, as described in connection with FIG. 9, for example. At block 1630, the communication device can monitor presence of the second signal in the communication channel using the second clear channel assessment (e.g., energy detect mechanism). In some embodiments, the second CCA can be performed, for example, in concurrently with the CCA. Thus, at block 1640, the communication device can monitor presence of the second signal in the communication channel using the clear channel assessment (e.g., MDP mechanism). At block 1650, the communication device can configure the power threshold associated with the second CCA to be equal to a second defined threshold value (e.g., P' dBm) in response to detecting presence of the second signal via the clear channel assessment (e.g., MPD mechanism).

Figure 17:
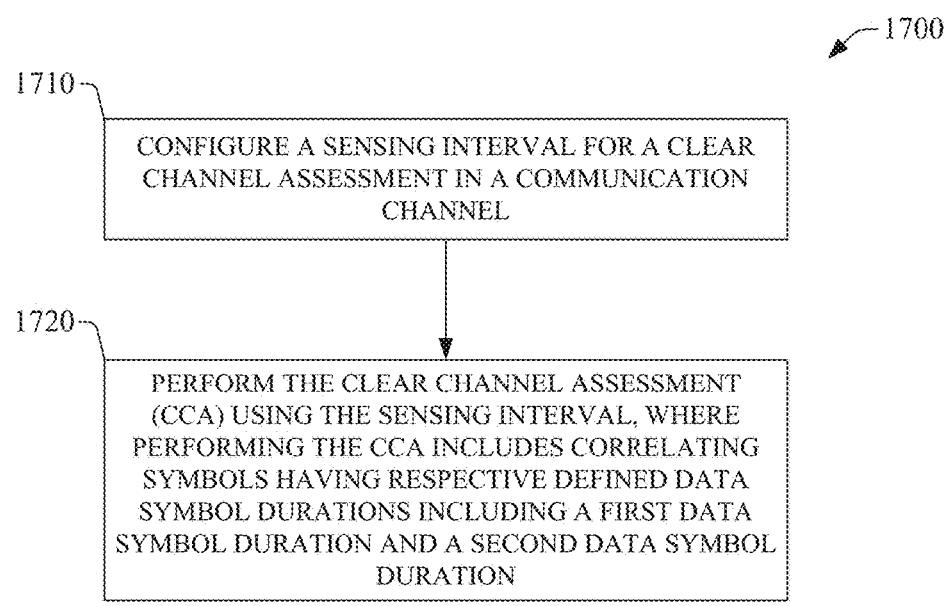

FIG. 17 illustrates an example method 1700 for performing channel assessment in accordance with one or more embodiments of the disclosure. A communication device or one or more components therein (e.g., circuitry or other types of processors) in accordance with aspects of this disclosure can implement (e.g., execute) the example method 1700 partially or in its entirety. In some embodiments, the communication device is embodied in or can constitute one of the device(s) 120. At block 1710, the communication device can configure a sensing interval for a clear channel assessment in a communication channel. In one embodiment, the communication channel can be embodied in or can include a secondary channel according to IEEE 802.11ax or related legacy standards. At block 1720, the communication device can perform the clear channel assessment (CCA) using the sensing interval in accordance with aspects of this disclosure. Specifically, in some implementations, performing the CCA can include correlating symbols having respective defined data symbol durations including first data symbol duration (e.g., 12.8 µs=4×3.2 µs) and second data symbol duration (3.2 µs). In one example, as described herein, the correlating comprises correlating symbols each having a data symbol duration of about 12.8 µs. In another example, the correlating comprises correlating first symbols each having a first data symbol duration of about 3.2 µs and further correlating second symbols each having a second data symbol duration of about 12.8 µs.

Figure 18:
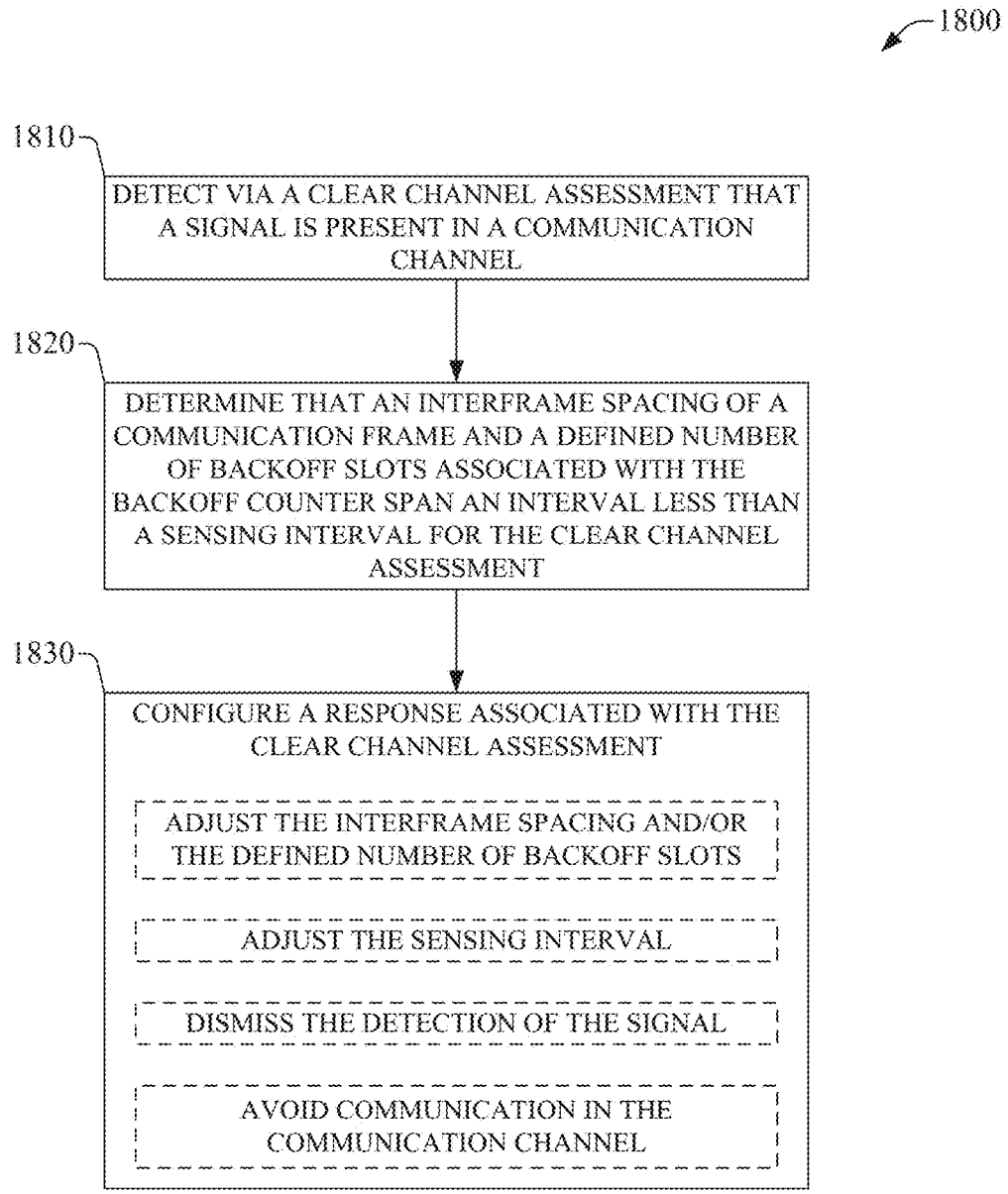

FIG. 18 illustrates an example method 1800 for performing channel assessment in accordance with one or more embodiments of the disclosure. A communication device or one or more components therein (e.g., circuitry or other types of processors) in accordance with aspects of this disclosure can implement (e.g., execute) the example method 1700 partially or in its entirety. In some embodiments, the communication device is embodied in or can constitute one of the device(s) 120. At block 1810, the communication device can detect, via a clear channel assessment, that a signal is present in a communication channel. In one example, the CCA can utilize or otherwise relay on guard interval (GI) correlation as described herein in connection with FIG. 2. At block 1820, the communication device can determine that an interframe spacing of a communication frame (control frame or data frame) and a defined number of backoff slots associated with a backoff counter span an interval less than a sensing interval for the clear channel assessment. It is noted that the defined number of backoff slots can establish a contention window randomly selected by the communication device.

At block 1830, the communication device can configure a response associated with the clear channel assessment. As described herein, the response can be specific to the communication channel referred to in block 1810. In one embodiment, configuring the response can include adjusting the interframe spacing and/or the defined number of backoff slots. Specifically, for example, the communication device can increase the interframe spacing to an updated interframe spacing, so that the interval spanned by the updated interframe spacing and the defined number of backoff slots can be equal to or greater than the sensing time, rather than satisfying the condition presented at block 1820. For another example, in a scenario in which the communication channel is a primary channel according to IEEE 802.11ax or other IEEE 802.11 protocols, the communication device can increase the defined number of backoff slots to an updated defined number of backoff slots in order for the combination of the backoff slots and the interframe spacing to span an interval at least equal to the sensing time. Similarly, for yet another example, for the primary channel, rather than increasing the defined number of backoff slots, the communication device can redraw randomly a new number of backoff slots, and can determined whether the condition at block 1820 is satisfied or the CCA can be implemented using the sensing time. In yet another example, the communication device can adjust the sensing interval to an updated sensing interval that is shorter in order to avoid the condition at block 1820. Such an adjustment can result in less detection reliability. For still another example, the communication device can dismiss or otherwise disregard the detection of the signal in the communication channel.

In addition or in other embodiments, in a scenario in which the communication channel is embodied in or include a secondary channel according to IEEE 802.11ax or related communication protocols, the communication device can configure the response associated with the clear channel assessment by avoiding communication in the communication channel.

Additional or alternative embodiments of the disclosure readily emerge from the description herein and the annexed drawings. In certain embodiments, the disclosure provides at least one computer-readable non-transitory storage medium having instructions stored thereon that, when executed by one or more processors of a communication device, direct the one or more processors to perform operations comprising: determining a sensing interval associated with performing a clear channel assessment in a communication channel; determining an interframe spacing associated with a defined frame; detecting via the clear channel assessment, using the sensing interval, that a signal is present in the communication channel; and determining that the sensing interval overlaps a backoff period by the defined number of backoff slots, and increasing a backoff counter by the defined number of backoff slots.

In addition or in other embodiments of the at least one computer-readable non-transitory storage medium, the operations can further include restarting the backoff operation for a next contention using the increased backoff counter.

In addition or in other embodiments of the at least one computer-readable non-transitory storage medium, the signal can include a transmission frame according to a defined communication protocol, and the operations can further include determining that a power of the transmission frame is greater than a defined threshold value; and deferring contention for a defined deferral period spanned by consecutive fields in the transmission frame.

In addition or in other embodiments of the at least one computer-readable non-transitory storage medium, the signal can include a transmission frame according to a defined communication protocol, and the operations can further include: determining that a power of the transmission frame is greater than a defined threshold value; configuring a power threshold associated with a second clear channel assessment to be equal to the defined threshold value for detection of a second signal according to the defined protocol; monitoring presence of the second signal in the communication channel using the second clear channel assessment; monitoring presence of the second signal in the communication channel using the clear channel assessment; and configuring the power threshold to be equal to a second defined threshold value in response to the detecting via the clear channel assessment.

In some implementations, the monitoring the presence of the second signal using the clear channel assessment can include correlating symbols associated with the second signal, and the monitoring the presence of the second signal using the second clear channel assessment can include evaluating an amount of energy associated with a portion of the second signal.

In addition or in other embodiments of the at least one computer-readable non-transitory storage medium, the operations can further include determining that the interframe spacing and a defined second number of backoff slots associated with the backoff counter span an interval less than the sensing interval. The disclosure provides various responses to such a determination. More specifically, in certain embodiments of the at least one computer-readable non-transitory storage medium, the operations can further include reducing the sensing interval to match the interval. In addition or in other embodiments of the at least one computer-readable non-transitory storage medium, in response to such a determination, the operations can include foregoing implementation of the clear channel assessment. Further or in other embodiments of the at least one computer-readable non-transitory storage medium, in response to the determination, the operations can further include adding a defined third number of backoff slots to the defined second number of backoff slots, and wherein the defined third number of backoff slots and the defined second number of backoff slots span a second interval at least equal to the sensing interval. In addition or in further embodiments of the at least one computer-readable non-transitory storage medium, in response to the determination, the operations can further include selecting a defined third number of backoff slots greater than the defined second number of backoff slots, and wherein the defined third number of backoff slots and the interframe spacing span a second interval at least equal to the sensing interval. Further or in yet other embodiments of the at least one computer-readable non-transitory storage medium, the selecting the defined third number of backoff slots can include randomly drawing the defined third number of backoff slots.

The disclosure also can provide other non-transitory storage media or storage devices. More specifically, the disclosure provides at least one computer-readable non-transitory storage medium having instructions stored thereon that, when executed by one or more processors of a communication device, direct the one or more processors to perform operations comprising: configuring a sensing interval for a clear channel assessment in a communication channel; and performing the clear channel assessment using the sensing interval, wherein the performing comprises correlating symbols having respective defined data symbol durations, wherein a defined data symbol duration of the respective defined data symbol durations is one of 12.8 µs or 3.2 µs.

In addition or in other embodiments of the at least one computer-readable non-transitory storage medium, the communication channel can include a primary channel according to an IEEE 802.11 communication protocol, and the correlating comprises correlating symbols each having a data symbol duration of about 12.8 µs.

In addition or in other embodiments of the at least one computer-readable non-transitory storage medium of claim 12, wherein the communication channel comprises a secondary channel according to an IEEE 802.11 communication protocol, and wherein the correlating comprises correlating first symbols each having a first data symbol duration of about 3.2 µs and further correlating second symbols each having a second data symbol duration of about 12.8 µs.

The disclosure also can provide devices for wireless communications, which in some embodiments can be referred to as communication devices. Specifically, the disclosure provides a communication device including: a transceiver device configured to transmit and receive wireless signals; one or more antennas coupled to the transceiver device; one or more processors coupled with the transceiver device; at least one memory device that stores computer-executable instructions; and at least one processor of the one or more processors configured to access the at least one memory device. In one example, the transceiver can be included (e.g., integrated into) or coupled to a radio unit configured to receive first wireless signal according to a first radio technology protocol. The radio unit can be further configured to send second wireless signal according to the first radio technology protocol. It is noted the radio unit can be included in the communication device, and that the one or more antennas can be coupled to the radio unit. The at least one processor of the one or more processors is configured to execute the computer-executable instructions to: determine a sensing interval associated with performing a clear channel assessment in a communication channel; determine an interframe spacing associated with a defined frame; detect via the clear channel assessment, using the sensing interval, that a signal is present in the communication channel; and determine that the sensing interval overlaps a backoff period by the defined number of backoff slots, and increase a backoff counter by the defined number of backoff slots.

In addition or in other embodiments of the communication device, the at least one processor of the one or more processors is further configured to execute the computer-executable instructions to restart the backoff operation for a next contention using the increased backoff counter.

In addition or in other embodiments of the communication device, the signal comprises a transmission frame according to a defined communication protocol, and the at least one processor of the one or more processors is further configured to execute the computer-executable instructions to: determine that a power of the transmission frame is greater than a defined threshold value; and defer contention for a defined deferral period spanned by consecutive fields in the transmission frame.

In addition or in other embodiments of the communication device, the signal comprises a transmission frame according to a defined communication protocol. In addition, the at least one processor of the one or more processors can be further configured to execute the computer-executable instructions to: determine that a power of the transmission frame is greater than a defined threshold value; configure a power threshold associated with a second clear channel assessment to be equal to the defined threshold value for detection of a second signal according to the defined protocol; monitor presence of the second signal in the communication channel using the second clear channel assessment; monitor presence of the second signal in the communication channel using the clear channel assessment; and configure the power threshold to be equal to a second defined threshold value in response to the detecting via the clear channel assessment.

Further or in other embodiments of the communication device, the at least one processor can be further configured to execute the computer-executable instructions to correlate symbols associated with the second signal, and the at least one processor can be further configured to execute the computer-executable instructions to evaluate an amount of energy associated with a portion of the second signal.

In addition or in other embodiments of the communication device, the at least one processor of the one or more processors can be further configured to execute the computer-executable instructions to determine that the interframe spacing and a defined second number of backoff slots associated with the backoff counter span an interval less than the sensing interval.

In addition or in other embodiments of the communication device, the at least one processor of the one or more processors can be further configured to execute the computer-executable instructions to reduce the sensing interval to match the interval.

In addition or in other embodiments of the communication device, the at least one processor of the one or more processors can be further configured to execute the computer-executable instructions to forego implementation of the clear channel assessment.

In addition or in other embodiments of the communication device, the at least one processor of the one or more processors can be further configured to execute the computer-executable instructions to add a defined third number of backoff slots to the defined second number of backoff slots, and wherein the defined third number of backoff slots and the defined second number of backoff slots span a second interval at least equal to the sensing interval.

In addition or in other embodiments of the communication device, the at least one processor of the one or more processors can be further configured to execute the computer-executable instructions to select a defined third number of backoff slots greater than the defined second number of backoff slots, and wherein the defined third number of backoff slots and the interframe spacing span a second interval at least equal to the sensing interval.

In addition or in other embodiments of the communication device, the at least one processor of the one or more processors can be further configured to execute the computer-executable instructions to configure randomly the defined third number of backoff slots.

As described herein, the disclosure also provides methods. More specifically, in one example, the disclosure provides a method including: determining, by circuitry of a device, a sensing interval associated with performing a clear channel assessment in a communication channel; determining, by the circuitry, an interframe spacing associated with a defined frame; detecting, by the circuitry, via the clear channel assessment, using the sensing interval, that a signal is present in the communication channel; and determining, by the circuitry, that the sensing interval overlaps a backoff period by the defined number of backoff slots, and increasing, by the circuitry, a backoff counter by the defined number of backoff slots.

In addition or in other embodiments of the method, the method can further include restarting, by the circuitry, the backoff operation for a next contention using the increased backoff counter.

In addition or in other embodiments of the method, the signal can include a transmission frame according to a defined communication protocol, where the method further comprises: determining, by the circuitry, that a power of the transmission frame is greater than a defined threshold value; and deferring, by the circuitry, contention for a defined deferral period spanned by consecutive fields in the transmission frame.

Further or in other embodiments of the method, the signal can include a transmission frame according to a defined communication protocol. In addition, the method can further include: determining, by the circuitry, that a power of the transmission frame is greater than a defined threshold value; configuring, by the circuitry, a power threshold associated with a second clear channel assessment to be equal to the defined threshold value for detection of a second signal according to the defined protocol; monitoring, by the circuitry, presence of the second signal in the communication channel using the second clear channel assessment; monitoring, by the circuitry, presence of the second signal in the communication channel using the clear channel assessment; and configuring, by the circuitry, the power threshold to be equal to a second defined threshold value in response to the detecting via the clear channel assessment. In certain implementations, the monitoring the presence of the second signal using the clear channel assessment can include correlating, by the circuitry, symbols associated with the second signal, and the monitoring the presence of the second signal using the second clear channel assessment can include evaluating, by the circuitry, an amount of energy associated with a portion of the second signal.

In addition or in other embodiments of the method, the method can further include determining, by the circuitry, that the interframe spacing and a defined second number of backoff slots associated with the backoff counter span an interval less than the sensing interval. As described herein, embodiments of the disclosure can provide various responses to such a determination. Specifically, in some embodiments, the method can further include reducing, by the circuitry, the sensing interval to match the interval. In other embodiments of the method, the method can further include foregoing, by the circuitry, implementation of the clear channel assessment. In addition or in other embodiments of the method, in response to the determination, the method can further include adding, by the circuitry, a defined third number of backoff slots to the defined second number of backoff slots, and the defined third number of backoff slots and the defined second number of backoff slots span a second interval at least equal to the sensing interval. Further or in other embodiments, in response to such a determination, the method can further include selecting, by the circuitry, a defined third number of backoff slots greater than the defined second number of backoff slots, and the defined third number of backoff slots and the interframe spacing span a second interval at least equal to the sensing interval. Further or in other embodiments of the method, the selecting the defined third number of backoff slots comprises randomly drawing, by the circuitry, the defined third number of backoff slots.

The disclosure also provides apparatuses for performing clear channel assessment under long sensing time. In one example, the disclosure provide an apparatus including: means for determining a sensing interval associated with performing a clear channel assessment in a communication channel; means for determining an interframe spacing associated with a defined frame; means for detecting via the clear channel assessment, using the sensing interval, that a signal is present in the communication channel; and means for determining that the sensing interval overlaps a backoff period by the defined number of backoff slots, and means for increasing a backoff counter by the defined number of backoff slots.

In addition or in some embodiments of the apparatus, the apparatus can further include means for restarting the backoff operation for a next contention using the increased backoff counter.

In addition or in other embodiments of the apparatus, the signal can include a transmission frame according to a defined communication protocol, and the apparatus can further include: means for determining that a power of the transmission frame is greater than a defined threshold value; and means for deferring contention for a defined deferral period spanned by consecutive fields in the transmission frame.

In addition or in other embodiments of the apparatus, the signal can include a transmission frame according to a defined communication protocol. In addition, the apparatus can further include means for determining that a power of the transmission frame is greater than a defined threshold value; means for configuring a power threshold associated with a second clear channel assessment to be equal to the defined threshold value for detection of a second signal according to the defined protocol; means for monitoring presence of the second signal in the communication channel using the second clear channel assessment; means for monitoring presence of the second signal in the communication channel using the clear channel assessment; and means for configuring the power threshold to be equal to a second defined threshold value in response to the detecting via the clear channel assessment.

In addition or in other embodiments of the apparatus, the means for monitoring the presence of the second signal using the clear channel assessment can include means for correlating symbols associated with the second signal, and the means for monitoring the presence of the second signal using the second clear channel assessment can include means for evaluating an amount of energy associated with a portion of the second signal.

In addition or in other embodiments, the apparatus can further include means for determining that the interframe spacing and a defined second number of backoff slots associated with the backoff counter span an interval less than the sensing interval.

In addition or in other embodiments, the apparatus can further include means for reducing the sensing interval to match the interval.

In addition or in other embodiments, the apparatus can further include means for foregoing implementation of the clear channel assessment.

In addition or in other embodiments, the apparatus can further include means for adding a defined third number of backoff slots to the defined second number of backoff slots, and the defined third number of backoff slots and the defined second number of backoff slots span a second interval at least equal to the sensing interval.

In addition or in other embodiments, the apparatus can further include means for selecting a defined third number of backoff slots greater than the defined second number of backoff slots, and the defined third number of backoff slots and the interframe spacing span a second interval at least equal to the sensing interval.

In addition or in other embodiments of the apparatus, the means for selecting the defined third number of backoff slots can include means for randomly drawing the defined third number of backoff slots.

As described herein, the disclosure provides devices for wireless communications, wherein clear channel assessment can be performed under long sensing time interval. In one example, the disclosure provides a device including: at least one memory device that stores computer-executable instructions; and at least one or more processors configured to access the at least one memory. The at least one processors of the one or more processors is configured to execute the computer-executable instructions to: configure a sensing interval for a clear channel assessment in a communication channel; and perform the clear channel assessment using the sensing interval, and within the clear channel assessment, correlate symbols having respective defined data symbol durations, wherein a defined data symbol duration of the respective defined data symbol durations is one of 12.8 μs or 3.2 μs. In some embodiments, the communication device can include a transceiver that can be included (e.g., integrated into) or coupled to a radio unit configured to receive first wireless signal according to a first radio technology protocol. The radio unit can be further configured to send second wireless signal according to the first radio technology protocol. It is noted the radio unit can be included in the communication device, and that the one or more antennas can be coupled to the radio unit.

In addition or in other embodiments of the device, the communication channel can include a primary channel according to an IEEE 802.11 communication protocol, and the at least one processor can be further configured to execute the computer-executable instructions to correlate symbols each having a data symbol duration of about 12.8 μs.

In addition or in other embodiments of the device, the communication channel can include a secondary channel according to the IEEE 802.11 communication protocol, and wherein the at least one processor can be further configured to execute the computer-executable instructions to correlate first symbols each having a first data symbol duration of about 3.2 μs, and further to correlate second symbols each having a second data symbol duration of about 12.8 μs.

The disclosure also provides a method including: configuring, by circuitry of a communication device, a sensing interval for a clear channel assessment in a communication channel; and performing, by the circuitry, the clear channel assessment using the sensing interval. Performing the clear channel assessment can include correlating symbols having respective defined data symbol durations, where a defined data symbol duration of the respective defined data symbol durations is one of 12.8 μs or 3.2 μs.

In addition or in some embodiments of the method, the communication channel can include a primary channel in IEEE 802.11, and the correlating can include correlating symbols each having a data symbol duration of about 12.8 μs.

In addition or in other embodiments of the method, the communication channel can include a secondary channel in IEEE 802.11, and the means for correlating can include correlating first symbols each having a first data symbol duration of about 3.2 μs and further correlating second symbols each having a second data symbol duration of about 12.8 μs.

As described herein, the disclosure can provide apparatuses for performing clear channel assessment under long sensing interval. In one example, the disclosure provides an apparatus including: means for configuring a sensing interval for a clear channel assessment in a communication channel; and means for performing the clear channel assessment using the sensing interval. In some implementations, the means for performing the clear channel assessment can include means for correlating symbols having respective defined data symbol durations, wherein a defined data symbol duration of the respective defined data symbol durations is one of 12.8 µs or 3.2 µs.

In addition or in other embodiments of the apparatus, the communication channel can include a primary channel in IEEE 802.11, and the means for correlating can include means for correlating symbols each having a data symbol duration of about 12.8 µs.

In addition or in other embodiments of the apparatus, the communication channel can include a secondary channel in IEEE 802.11, and the means for correlating can include means for correlating first symbols each having a first data symbol duration of about 3.2 µs and further means for correlating second symbols each having a second data symbol duration of about 12.8 µs.

As described herein, the disclosure provides a number of techniques. Accordingly, the disclosure provides an apparatus comprising means for performing a method as described and/or claimed in the present specification and/or annexed drawings.

In addition or in other embodiments, the disclosure can provide a communication device including at least one memory device having programmed instructions that, in response to execution, cause at least one processor to perform a method as described and/or claimed in the present specification and/or annexed drawings.

In addition or in other embodiments, the disclosure provides a communication device including at least one memory device having programmed instructions that, in response to execution, can cause at least one processor or another type of circuitry to perform a method as described and or claimed in the present specification and/or drawings.

In addition or in other embodiments, the disclosure can provide at least one processor-accessible memory device having programmed instruction that, in response to execution, can cause at least one processor to perform a method or realize an apparatus as described and/or claimed in the present specification and/or annexed drawings.

In addition or in other embodiments, the disclosure can provide machine-readable non-transitory storage including machine-readable instructions, when executed, to implement a method or realize an apparatus as described and/or claimed in the present specification and/or annexed drawings.

As described herein, the operations and processes described herein may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It can be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Various embodiments of the disclosure may take the form of an entirely or partially hardware embodiment, an entirely or partially software embodiment, or a combination of software and hardware (e.g., a firmware embodiment). Furthermore, as described herein, various embodiments of the disclosure (e.g., methods and systems) may take the form of a computer program product comprising a computer-readable non-transitory storage medium having computer-accessible instructions (e.g., computer-readable and/or computer-executable instructions) such as computer software, encoded or otherwise embodied in such storage medium. Those instructions can be read or otherwise accessed and executed by one or more processors to perform or enable performance of the operations described herein. The instructions can be provided in any suitable form, such as source code, compiled code, interpreted code, executable code, static code, dynamic code, assembler code, combinations of the foregoing, and the like. Any suitable computer-readable non-transitory storage medium may be utilized to form the computer program product. For instance, the computer-readable medium may include any tangible non-transitory medium for storing information in a form readable or otherwise accessible by one or more computers or processor (s) functionally coupled thereto. Non-transitory storage media can include read only memory (ROM); random access memory (RAM); magnetic disk storage media; optical storage media; flash memory, etc.

Unless otherwise expressly stated, it is in no way intended that any protocol, procedure, process, or method set forth herein be construed as requiring that its acts or steps be performed in a specific order. Accordingly, where a process or method claim does not actually recite an order to be followed by its acts or steps or it is not otherwise specifically recited in the claims or descriptions of the subject disclosure that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification or annexed drawings, or the like.

As used in this application, the terms "component," "environment," "system," "architecture," "interface," "unit," "engine," "platform," "module," and the like are intended to refer to a computer-related entity or an entity related to an operational apparatus with one or more specific functionalities. Such entities may be either hardware, a combination of hardware and software, software, or software in execution. As an example, a component may be, but is not limited to being, a process running on a processor, a processor, an object, an executable portion of software, a thread of execution, a program, and/or a computing device. For example, both a software application executing on a computing device and the computing device can be a component. One or more components may reside within a process and/or thread of execution. A component may be localized on one computing device or distributed between two or more computing devices. As described herein, a component can execute from various computer-readable non-transitory media having various data structures stored thereon. Components can communicate via local and/or remote processes in accordance, for example, with a signal (either analogic or digital) having one or more data packets (e.g., data from one component interacting with another component in a local system, distributed system, and/or across a network such as a wide area network with other systems via the signal). As another example, a component can be an apparatus with specific functionality provided by mechanical parts operated by electric or electronic circuitry that is controlled by a software application or firmware application executed by a processor, wherein the processor can be internal or external to the apparatus and can execute at least a part of the software or firmware application. As yet another example, a component can be an apparatus that provides specific functionality through electronic components without mechanical parts, the electronic components can include a processor therein to execute software or firmware that confers at least in part the functionality of the electronic components. An interface can include input/output (I/O) components as well as associated processor, application, and/or other programming components. The terms "component," "environment," "system," "architecture," "interface," "unit," "engine," "platform," "module" can be utilized interchangeably and can be referred to collectively as functional elements.

In the present specification and annexed drawings, reference to a "processor" is made. As utilized herein, a processor can refer to any computing processing unit or device comprising single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit (IC), an application-specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. A processor can be implemented as a combination of computing processing units. In certain embodiments, processors can utilize nanoscale architectures such as, but not limited to, molecular and quantum-dot based transistors, switches and gates, in order to optimize space usage or enhance performance of user equipment.

In addition, in the present specification and annexed drawings, terms such as "store," "storage," "data store," "data storage," "memory," "repository," and substantially any other information storage component relevant to operation and functionality of a component of the disclosure, refer to "memory components," entities embodied in a "memory," or components forming the memory. It can be appreciated that the memory components or memories described herein embody or comprise non-transitory computer storage media that can be readable or otherwise accessible by a computing device. Such media can be implemented in any methods or technology for storage of information such as computer-readable instructions, information structures, program modules, or other information objects. The memory components or memories can be either volatile memory or non-volatile memory, or can include both volatile and non-volatile memory. In addition, the memory components or memories can be removable or non-removable, and/or internal or external to a computing device or component. Example of various types of non-transitory storage media can comprise hard-disc drives, zip drives, CD-ROM, digital versatile disks (DVD) or other optical storage, magnetic cassettes, magnetic tape, magnetic disk storage or other magnetic storage devices, flash memory cards or other types of memory cards, cartridges, or any other non-transitory medium suitable to retain the desired information and which can be accessed by a computing device.

As an illustration, non-volatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The disclosed memory components or memories of operational environments described herein are intended to comprise one or more of these and/or any other suitable types of memory.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, devices, techniques, and computer program products that can provide mechanisms for clear channel assessment of a communication channel in a wireless environment. Implementation or otherwise execution of the mechanisms can provide fairness in the utilization of wireless communication resources among communication devices. It is, of course, not possible to describe every conceivable combination of elements and/or methods for purposes of describing the various features of the disclosure, but it can be recognized that many further combinations and permutations of the disclosed features are possible. Accordingly, it may be apparent that various modifications can be made to the disclosure without departing from the scope or spirit thereof. In addition or in the alternative, other embodiments of the disclosure may be apparent from consideration of the specification and annexed drawings, and practice of the disclosure as presented herein. It is intended that the examples put forward in the specification and annexed drawings be considered, in all respects, as illustrative and not restrictive. Although specific terms are employed herein, they are used in a generic and descriptive sense only and not for purposes of limitation.

What is claimed is:

1. At least one computer-readable non-transitory storage medium having instructions stored thereon that, when executed by one or more processors of a communication device, direct the one or more processors to perform operations comprising:
   determining a sensing interval associated with performing a clear channel assessment in a communication channel;
   determining an interframe spacing representing a time interval during which to perform the clear channel assessment;
   detecting that a signal is present in the communication channel during a backoff period, wherein the backoff period follows the interframe spacing and comprises one or more backoff slots;
   determining a number of the one or more backoff slots which overlap the sensing interval; and
   increasing the backoff period by the number of the one or more backoff slots which overlap the sensing interval.

2. The at least one computer-readable non-transitory storage medium of claim 1, wherein the operations further comprise restarting a backoff operation using the increased backoff period.

3. The at least one computer-readable non-transitory storage medium of claim 1, wherein the signal comprises a transmission frame according to a defined communication protocol, and wherein the operations further comprise:
   determining that a power of the transmission frame is greater than a defined threshold value; and
   deferring contention for the communication channel for a defined deferral period spanned by consecutive fields in the transmission frame.

4. The at least one computer-readable non-transitory storage medium of claim 1, wherein the signal comprises a transmission frame according to a defined communication protocol, and wherein the operations further comprise:
   determining that a power of the transmission frame is greater than a defined threshold value;
   configuring a power threshold associated with a second clear channel assessment to be equal to the defined threshold value for detection of a second signal according to the defined communication protocol;
   monitoring presence of the second signal in the communication channel using the second clear channel assessment;
   monitoring presence of the second signal in the communication channel using the clear channel assessment; and
   configuring the power threshold to be equal to a second defined threshold value in response to the detecting via the clear channel assessment.

5. The at least one computer-readable non-transitory storage medium of claim 4, wherein the monitoring the presence of the second signal using the clear channel assessment comprises correlating symbols associated with the second signal, and wherein the monitoring the presence of the second signal using the second clear channel assessment comprises evaluating an amount of energy associated with a portion of the second signal.

6. The at least one computer-readable non-transitory storage medium of claim 1, wherein the operations further comprise determining that the interframe spacing and a defined second number of the one or more backoff slots associated with the backoff period span an interval less than the sensing interval.

7. The at least one computer-readable non-transitory storage medium of claim 6, wherein the operations further comprise reducing the sensing interval to match the interval.

8. The at least one computer-readable non-transitory storage medium of claim 6, wherein the operations comprise foregoing implementation of the clear channel assessment.

9. The at least one computer-readable non-transitory storage medium of claim 6, wherein the operations further comprise adding a defined third number of the one or more backoff slots to the defined second number of the one or more backoff slots, and wherein the defined third number of the one or more backoff slots and the defined second number of the one or more backoff slots span a second interval at least equal to the sensing interval.

10. The at least one computer-readable non-transitory storage medium of claim 6, wherein the operations further comprise selecting a defined third number of the one or more backoff slots greater than the defined second number of the one or more backoff slots, and wherein the defined third number of the one or more backoff slots and the interframe spacing span a second interval at least equal to the sensing interval.

11. The at least one computer-readable non-transitory storage medium of claim 10, wherein the selecting the defined third number of the one or more backoff slots comprises randomly drawing the defined third number of the one or more backoff slots.

12. At least one computer-readable non-transitory storage medium having instructions stored thereon that, when executed by one or more processors of a communication device, direct the one or more processors to perform operations comprising:
    configuring a sensing interval for a clear channel assessment in a communication channel;
    determining an interframe spacing representing a time interval during which to perform the clear channel assessment;

performing the clear channel assessment using the sensing interval, wherein the performing comprises correlating symbols having respective defined data symbol durations, wherein a defined data symbol duration of the respective defined data symbol durations is one of 12.8 µs or 3.2 µs;

detecting that a signal is present in the communication channel during a backoff period, wherein the backoff period follows the interframe spacing and comprises one or more backoff slots;

determining a number of the one or more backoff slots which overlap the sensing interval; and increasing the backoff period by the number of the one or more backoff slots which overlap the sensing interval.

13. The at least one computer-readable non-transitory storage medium of claim 12, wherein the communication channel comprises a primary channel according to an IEEE 802.11 communication protocol, and wherein the correlating comprises correlating symbols each having a data symbol duration of about 12.8 µs.

14. The at least one computer-readable non-transitory storage medium of claim 12, wherein the communication channel comprises a secondary channel according to an IEEE 802.11 communication protocol, and wherein the correlating comprises correlating first symbols each having a first data symbol duration of about 3.2 µs and further correlating second symbols each having a second data symbol duration of about 12.8 µs.

15. A communication device, comprising:
at least one memory device that stores computer-executable instructions; and
one or more processors coupled to the at least one memory device, at least one processor of the one or more processors being configured to access the at least one memory device, and being further configured to execute the computer-executable instructions to:
determine a sensing interval associated with performing a clear channel assessment in a communication channel;
determine an interframe spacing representing a time interval during which to perform the clear channel assessment;
detect that a signal is present in the communication channel during a backoff period, wherein the backoff period follows the interframe spacing and comprises one or more backoff slots;
determine a number of the one or more backoff slots which overlap the sensing interval; and
increase the backoff period by the number of the one or more backoff slots which overlap the sensing interval.

16. The communication device of claim 15, wherein the at least one processor of the one or more processors is further configured to execute the computer-executable instructions to restart a backoff operation using the increased backoff period.

17. The communication device of claim 15, wherein the signal comprises a transmission frame according to a defined communication protocol, and wherein the at least one processor of the one or more processors is further configured to execute the computer-executable instructions to:
determine that a power of the transmission frame is greater than a defined threshold value; and
defer contention for a defined deferral period spanned by consecutive fields in the transmission frame.

18. The communication device of claim 15, wherein the signal comprises a transmission frame according to a defined communication protocol, and wherein the at least one processor of the one or more processors is further configured to execute the computer-executable instructions to:
determine that a power of the transmission frame is greater than a defined threshold value;
configure a power threshold associated with a second clear channel assessment to be equal to the defined threshold value for detection of a second signal according to the defined communication protocol;
monitor presence of the second signal in the communication channel using the second clear channel assessment;
monitor presence of the second signal in the communication channel using the clear channel assessment; and
configure the power threshold to be equal to a second defined threshold value in response to the detecting via the clear channel assessment.

19. The communication device of claim 18, wherein the at least one processor is further configured to execute the computer-executable instructions to correlate symbols associated with the second signal, and wherein the at least one processor is further configured to execute the computer-executable instructions to evaluate an amount of energy associated with a portion of the second signal.

20. The communication device of claim 15, wherein the at least one processor of the one or more processors is further configured to execute the computer-executable instructions to determine that the interframe spacing and a defined second number of the one or more backoff slots associated with the backoff period span an interval less than the sensing interval.

21. The communication device of claim 20, wherein the at least one processor of the one or more processors is further configured to execute the computer-executable instructions to add a defined third number of the one or more backoff slots to the defined second number of the one or more backoff slots, and wherein the defined third number of the one or more backoff slots and the defined second number of the one or more backoff slots span a second interval at least equal to the sensing interval.

22. The communication device of claim 20, wherein the at least one processor of the one or more processors is further configured to execute the computer-executable instructions to select a defined third number of the one or more backoff slots greater than the defined second number of the one or more backoff slots, and wherein the defined third number of the one or more backoff slots and the interframe spacing span a second interval at least equal to the sensing interval.

23. The communication device of claim 22, wherein the at least one processor of the one or more processors is further configured to execute the computer-executable instructions to configure randomly the defined third number of the one or more backoff slots.

24. The communication device of claim 15, further comprising a radio unit configured to receive first wireless signal according to a first radio technology protocol, and further configured to send second wireless signal according to the first radio technology protocol.

25. The communication device of claim 24, further comprising one or more antennas functionally coupled to the radio unit.

* * * * *